(12) United States Patent
Maki et al.

(10) Patent No.: US 10,650,352 B2
(45) Date of Patent: May 12, 2020

(54) MULTIPLE-EMPLOYEE PERSONAL CELL PHONE SECURE STORAGE TIME CLOCK APPARATUS AND TIMEKEEPING SYSTEM

(71) Applicant: HonesTime, LLC, Hancock, MI (US)

(72) Inventors: Jacob G. Maki, Chassell, MI (US); Aaron H. Maki, Chassell, MI (US); Frank C. Fiala, Hancock, MI (US)

(73) Assignee: HonesTime, LLC, Hancock, MI (US)

( * ) Notice: Subject to any disclaimer, the term of this patent is extended or adjusted under 35 U.S.C. 154(b) by 0 days.

(21) Appl. No.: 16/262,124

(22) Filed: Jan. 30, 2019

(65) Prior Publication Data

US 2019/0236553 A1 Aug. 1, 2019

Related U.S. Application Data

(60) Provisional application No. 62/623,890, filed on Jan. 30, 2018.

(51) Int. Cl.
| | |
|---|---|
| *G06Q 10/10* | (2012.01) |
| *G07C 1/32* | (2006.01) |
| *G07C 9/20* | (2020.01) |
| *G07C 9/23* | (2020.01) |
| *G07C 9/25* | (2020.01) |
| *G07C 9/26* | (2020.01) |

(52) U.S. Cl.
CPC .......... *G06Q 10/1091* (2013.01); *G07C 1/32* (2013.01); *G07C 9/20* (2020.01); *G07C 9/23* (2020.01); *G07C 9/257* (2020.01); *G07C 9/26* (2020.01)

(58) Field of Classification Search
CPC .. G06Q 10/1091; G07C 1/32; G07C 9/00007; G07C 9/00039; G07C 9/00087
See application file for complete search history.

(56) References Cited

U.S. PATENT DOCUMENTS

| | | | | |
|---|---|---|---|---|
| 2003/0069796 | A1* | 4/2003 | Elwood | G01K 1/022 705/23 |
| 2013/0290154 | A1* | 10/2013 | Cherry | G06Q 40/00 705/32 |
| 2015/0077221 | A1* | 3/2015 | Peters | G07F 17/00 340/5.28 |
| 2017/0027079 | A1* | 1/2017 | Dombrowski | H02J 5/00 |
| 2017/0323503 | A1* | 11/2017 | Garcia | G07C 9/00309 |
| 2019/0077597 | A1* | 3/2019 | Janwadkar | C07F 11/00 |
| 2019/0158650 | A1* | 5/2019 | Isgar | H04M 1/72563 |

\* cited by examiner

*Primary Examiner* — Nabil H Syed
(74) *Attorney, Agent, or Firm* — Honigman LLP

(57) ABSTRACT

A mobile device storage and tracking system includes a housing and a carousel disposed in the housing and having a plurality of storage spaces. Responsive to a user input that is indicative of a particular user, a control rotates the carousel to position a selected storage space at a door and unlocks the door, whereby the particular user can store a mobile device at that selected storage space. After the user stores the mobile device at that selected storage space, the control closes and locks the door. When the particular user again provides the user input, the control unlocks the door and rotates the carousel to position the selected storage space at the door. The control is operable to track, for each particular user, when the particular user's mobile device is at the carousel and when the particular user's mobile device has been removed from the carousel.

17 Claims, 19 Drawing Sheets

MULTIPLE-EMPLOYEE PERSONAL CELL PHONE SECURE STORAGE TIME CLOCK APPARATUS AND TIMEKEEPING SYSTEM

CROSS REFERENCE TO RELATED APPLICATION

The present application claims the filing benefits of U.S. provisional application Ser. No. 62/623,890, filed Jan. 30, 2018, which is hereby incorporated herein by reference in its entirety.

FIELD OF THE INVENTION

The present invention relates generally to the field of automated employee timekeeping within businesses enterprises.

BACKGROUND OF THE INVENTION

It is generally known and accepted that within most commercial business establishments, employees on the job tend to carry their personal cell phones, smartphones or personal communication devices with them at all times. Technological innovation has fundamentally changed the way society lives and communicates. Advances in internet speed and connection capability combined with smart phone functionality and availability offers society newfound freedom to expand and new perspectives of the world and connect with the information that is so readily available.

The unintended side effect of this new freedom and ready access to knowledge is the increased likelihood of distraction and reduced productivity as the power and capabilities of smart electronic devices have tended to seduce and blur the lines between professional and personal instant communication arenas. Unwarranted distraction on the job has merely been redressed and accepted as common multitasking in the new and current age of social multi-media digital communication.

A series of recent studies suggest that in the United States, approximately 77 percent or 7 out of 10 Americans currently use social media. On average, research results suggest that people tend to check their cell phones approximately 110 times per day. The total average time spent per day using a mobile communication device is estimated at approximately 3 hours 15 minutes.

A known problem related to these findings exists in the fields of business and industry. Employers who have employees that rely on nearly continuous streams of outside personal communication through their personal cell phones and electronic devices represent a significant loss of productivity within their businesses operations. The impact on employee productivity and the resulting costs to businesses can rapidly add up over time and as the number of employees increase.

As an example of the cost of employee distraction, another recent study suggests that on average 83 percent of workers maintain their smart phones within an arm's reach or within eye contact during their work day. Two thirds of workers use their smart phones at least several times each day during work periods. 75 percent of employers have estimated that on average, two hours of each day are lost because of worker distraction related to, for example, random snack breaks, personal gossip, noisy co-workers and especially personal communication devices. This is largely because personal communication devices are typically within constant reach and remain accessible for immediate attention by employees for personal electronic communications. Therefore, it is further estimated that up to 65 percent of the total 2 hours previously referred to, or approximately 78 minutes of company work time are spent on personal cell phone calls and text messaging alone.

Combating cell phone abuse in the workplace is not a simple task. Cell phone use has become a widely accepted norm within most workplaces. Employers need to identify and dedicate both company resources and time to develop clear and acceptable cell phone policy and rules in the workplace. This further includes additional resources and effort expended in an ongoing basis among their workforce to constantly monitor and enforce any company policies and rules set in place. None of these resources or efforts should be dismissed as being cost or time free. The likely total of additional costs goes well beyond that of employee wages, lost time, and reduced productivity. It is estimated that about 75 percent of employers have taken at least some proactive steps to help reduce cell phone distraction in the workplace, with nearly 26 percent simply banning the use of personal cell phones for example in the workplace during company time. Again, fair and reasonable enforcement of such policies can become a source of negative controversy and distraction in and of itself within any organization.

While employee time tracking systems have constantly evolved through history, few if any have addressed the unique and somewhat technologically recent problem of employee distraction from personal communication devices. For example, one name brand product available on the market is Safescan. Safescan is an electronic employee clock-in system that offers the latest in radio frequency identification (RFID) proximity and biometric technology along with a proprietary time management computer software allowing employers to hopefully and more effectively manage and track their workforce activity. This system further includes office building or factory access door sensors, WIFI interfaces, and finger print ID technology to help ensure accuracy of employee on-duty work periods. The Safescan system can store up to 100,000 timestamp records for up to 3000 users per address site installation at an approximate base cost of $700.

With another name brand example, an employee time clock application offered by Tanda for cell phones and mobile devices offers a somewhat reliable method to track and monitor employee time and attendance. The product includes a wall mounted electronic keypad and display device and portable software application. The Tanda software application can be downloaded onto most any commercially available employee mobile communications device. It further includes some multiple failsafe aspects including custom employee personal identification numbers (PIN) and photo identification verified clock-in procedures and methods. Additionally and as an added benefit, employers can also use the application to electronically communicate with staff and assign work tasks via SMS and live on-screen updates. The Tanda product application offers the capacity to handle up to 2500 employees, auto populating of time sheets and monthly subscription payment options electronically billed to the employer or business.

Yet another currently available name brand product is offered by ChargeTech. ChargeTech is essentially a simple cell phone charging storage locker that allows any user or company employee to securely and safely store and charge their cell phone. Each discrete storage bay locker has its own lockable access door while the bay itself offers two full-speed power sources for multi-device charging. Each discrete storage bay can only be accessed with a confidential and uniquely pre-assigned PIN code supplied to the user. Each locker bay door includes its own individual keypad at the outer front face of the door of each locker compartment for securing each cell phone for individual access. The ChargeTech cell phone locker cabinet further provides cell phone charging and security for up to 2500 employees, auto populating of time sheets, and costs about $1250 per single base unit installation.

SUMMARY OF THE INVENTION

It is important to note that none of the example name-brand products or devices briefly described above completely address the essential combination of concerns with employee's cell phone and mobile device use on the job. For example, none address removing the distraction of having the cell phone at hand at all times, and tracking employee productive time, and tracking employee personal time when having possession of a personal communication device, all at the same time.

It is desirable to be able to accomplish all three aspects generally concurrently during a work shift to fully and more fairly address and solve the problem of productivity loss in the workplace due to personal mobile devices. The present invention accomplishes all three aspects and thus provides advantages for employers, business enterprises and organizations in a unique, simple and non-obvious or invasive way that further provides employee cell phone users their rightful and free willful use of their communication devices as desired. Simply put, the present invention provides a clear, readily communicated and useful means and method for employees and employers to automatically and alternately clock-in and clock-out from company or business work time according to and during the simple physical possession of their personal communication devices.

Many service or industrial manufacturing operations have employees that are paid or otherwise compensated for productive and undivided attention on the job. It is desirable for employers to more readily distinguish and automatically document, in a fair and reasonable way, instances of time devoted to on-productive employee personal time that is often likely to occur, such as instances of time that accumulate during the use of personal cell phones and portable hand-held communication devices while on the job. Personal communication devices have become the norm in today's technological society, and typically includes, for example, cell phones, smart phones, mobile text messaging devices, miniature or microcomputers and the like as personal communication technology and markets continue to advance and evolve.

The present invention is directed to address and solve a widespread and often overlooked and under-valued problem in today's workplaces, which is the frequent use of personal communication devices for personal communications by employees during paid working hours and paid company time. The present invention generally comprises two aspects: a desktop-sized machine or apparatus for temporary, safe and secure storage of an employee's personal communication device during his or hers assigned working hours, and an electronic automated timekeeping and recording system. The automated timekeeping is an automated network computer system including software for measuring and documenting both normal work periods and any personal communications time period instances that may occur during an employee's working hours or work shift. The present invention includes a desktop-sized machine apparatus designed to both securely store and sense the physical presence of the employee's personal communication device while it remains temporarily separated from instances of spontaneous use by its owner. This aspect of the present invention represents a simple and highly desirable physical solution toward eliminating the likelihood of immediate and often constant communication distractions of smartphones, for example, from the owner while he or she is working.

It has been determined that this category of workplace distractions has been on an ongoing widespread and dramatic increase for many years and can greatly affect job performance, worker productivity, and business profitability. Additionally, the present invention provides a much needed yet current technologically simple and improved equivalent of the long-familiar employee time clock. For example, time clocks have been extensively used by employers for decades to stamp and/or punch a card or electronically record and otherwise confirm and record an employee's arrival and departure times to and from a work shift. With the present invention, the employees' cell phone or personal communication device itself becomes the effective equivalent of a physical "time clock punch card" while further providing the distinct advantage and benefits temporarily separating the employee from their personal communication device while on the job. The key step of separation largely eliminates unnecessary personal cell phone and texting distractions, while also further providing a system of automated employee time keeping highly beneficial to all types of activities extending not only to businesses, but also government agencies, educational organizations, sports teams and all manner of organized multi-member operations and entities.

It should be clearly understood that the present invention continues to provide and maintain reasonable and ready employee access to only their personal communication device during work periods. During work shift periods for example, the device owner may freely elect to physically remove his or her personal communication device from the present invention's secure desktop storage unit. This is accomplished by using a two-step personal identification strategy: 1) a uniquely assigned and highly confidential user pass code or password, and 2) a biometric sensor, such as for example, a fingerprint or eye iris scanner-reader. In this way, any periods of non-working time that are directly associated with the simple physical possession of their personal communication device and likely cell phone use, may be automatically time-stamp documented by the employer's automated timekeeping system.

It should be clearly understood that the actual use or non-use of a smart phone, for example, is not documented or recorded in any way. Nor is the confidentiality of any personal communication compromised in any way what so ever. Thus ensuring an employee's personal privacy at all times. Whenever the cell phone or personal communication device is once again returned and locked within the automated storage device, the employee is once again automatically clocked-in and documented as again being on paid company time. It is therefore anticipated that the present invention will largely discourage, reduce and preferably solve the generally wide-spread problem of employee's being paid for non-productive work time during the use of their personal smartphones for personal calls or texting for example. Additionally, other social media and game applications, for example, have been identified as a prominent source of employee distraction in the workplace, outpacing personal calls and web browsing.

It is also envisioned that a significant market for the present invention exists both as a new employee timekeeping product and an improved interface aspect of business computer networks and operations. Various configurations and embodiments of the present invention are envisioned since the cell phone timekeeping secure storage device and control system may be readily adapted and optionally configured for use within a wide range of business and industrial enterprises while readily interfacing with computer network environments as desired.

Therefore, the present invention provides the benefit of a reasonably fair, accurate and automated means to document both productive compensated work time as well as non-compensated personal communication device time of employees. Use of the present invention would simply be an agreed upon prerequisite of employment between the employee and the employer. Such advantages of the present invention are recognized for the benefit of employees, employers and business organizations in an ongoing effort to promote workplace fairness and productivity. Additionally important is the business aspect of readily identifying, reducing and preferably completely avoiding unnecessary costs and financial losses associated with frequent or extended personal communication lost time incidents incurred by employees. Currently, these financial losses are estimated to be substantially significant and generally occur somewhat unknowingly to all parties involved, especially during periods that should in fact be defined as productive company time through profitable service and effort.

In accordance with an aspect of the present invention, the system or device of the present invention provides a multiple-employee personal cell phone secure storage and time clock apparatus and timekeeping system that utilize the simple physical presence of a cell phone as an employee time card. The device is controlled by an electronic computer motherboard that electronically senses, controls and allocates multiple individual storage units for cell phone temporary storage built within a circular carousel turntable that rotates about a generally vertical axis within a secure storage cabinet. Activation and use of the cell phone storage and time clock system and device is through a user keypad entry at a touch-sensitive display screen.

A particular embodiment of a circular carousel of the present invention supports and houses 11 generally triangular shaped storage chambers that are evenly spaced in a circular array. Ten of the generally triangular storage slots are enclosures, each having one open side facing outward at the outer-most periphery of the circular carousel. These 10 storage slots further include a pair of infrared sensors to detect the presence of a cell phone placed for temporary storage within it. One of the 11 slots is specially configured and does not include an open front with access to its interior portion and is simply blocked by a solid panel from normal access by a solid face or outer front surface. This solid-faced slot represents a non-storage security slot or home chamber of the circular carousel assembly whereby the position of the carousel is set to a parked position when the device is on stand-by and generally inactive. This blocked slot provides an added level of security for the overall device by further denying unauthorized user access to the remaining 10 actual cell phone storage slots should the main access door of the apparatus remain open for any reason. The presence of a cell phone within an assigned storage slot, in combination with the key pad entry of an employee code as well as a biometric sensor for identity confirmation, triggers the time clock system to indicate and record that the employee is checked-in, present and at work. Oppositely, the absence of any user log-in and the lack of a physically stored cell phone within the device automatically indicates and records that the employee is not checked-in, present or on duty for work. This provides the essential clock-in and clock-out timekeeping function of the present invention including temporary separation of the employee from their communication device during work periods.

The carousel assembly is selectively and automatically controlled, rotated and indexed by means of the electronic computer motherboard and an electric drive motor to rotate and index the carousel. This aspect provides user storage and access to an assigned cell phone storage slot for multiple users. A pair of stationary limit switches fixed-mounted near the front portion of the device and just below and under the carousel assembly are positioned to engage a circular array of 11 position indicators fixed at the bottom face of the carousel assembly. The intermittent engagement of the two limit or end stop switches with the respective 11 position indicators sense and control the proper alignment of each of the cell phone storage compartments. This allows the system to determine precisely where to alternately stop and selectively rotate and index the carousel assembly for access to any stored cell phones or empty cell phone storage compartments as determined by the control system.

The carousel assembly is housed within an enclosed main case assembly or cabinet. Employee access to an assigned cell phone storage slot is further controlled at the case front panel by a sliding access door that is automatically locked when the device is on stand-by, the carousel is parked, and the system is not being accessed. When the device is in parked or stand-by mode, the carousel is positioned or otherwise parked with the security guard slot aligned with the user access door opening. This design aspect provides a double level of security when the device is on stand-by or parked and not being used. This aspect is important in the preferably unlikely event that the front access door is somehow forced open or physically defeated during unauthorized attempted access to the stored contents of the apparatus. Additionally, the end stop switch at the user access door interfaces with the control system. If the access door switch should suddenly lose connection or sense any other operational logic abnormality, the control system is designed or programmed to initiate a lock-down of the cell phone storage apparatus and immediately send a malfunction alert to a system manager via an electronic communication such as a text or cell phone message. A systems malfunction alert and user instructions are also displayed at the user display panel of the storage system.

Upon activation of the present invention by an employee, an assigned access code is entered at the keypad controller, the device automatically senses, identifies and locates the position of an empty cell phone storage slot and rotates the carousel assembly to that position at the access door. The sliding access door unlocks and is opened by the employee. The employee places his or her cell phone into the storage slot, closes the access door, and activates the clock-in button. The access door is automatically locked, and the carousel automatically rotates and returns to the home or parked position. At this point, the employee is clocked-in for work duty. Once the access door is closed and automatically locked, the carousel assemblies including all stored phones within each of its respective storage compartment slots remain at rest. In this state, the security slot is again in line with the access door location until the apparatus is once again activated.

When the present invention is in use, the employee clock-in and clock-out time periods are automatically recorded, monitored and maintained through electronic digital communications and proprietary software through a proprietary company website service to the employer or business. Also during use, the employee may freely access their phones throughout their work shift, however removal of a cell phone from its active storage slot will record that the employee has automatically clocked-out of work, and in doing so they must return their cell phone to the same storage slot to clock back into work (or optionally a different storage slot or even a different carousel device, such as if the employee moves to a different work location during the work day). Optionally, a different storage slot may be selected by the control system and used to clock the employee back into work as the system will recognize the identity of the user. Clocking-in constitutes being on company time for continued pay and compensation purposes. Clocking-out constitutes personal time while at work or away from the premises. The proprietary software in combination with the mechanical machine portion of the present invention will track all employee time periods, deduct clock-out periods during work shifts, and record all work time for the payroll periods in the selected payroll accounting format. This data is automatically electronically provided to the business or organization through the invention company website portal. Employers, business and organization managers can then access and review all hours worked and all clocked-in and clocked-out out periods and durations, per employee and per multiple scheduled work periods and shifts.

These and other objects, advantages, purposes and features of the present invention will become apparent upon review of the following specifications and embodiments in conjunction with the drawings.

BRIEF DESCRIPTION OF THE DRAWINGS

FIG. 30A is an enlarged perspective view of the area 30A in FIG. 30, showing one of the carousel position indicators;

DESCRIPTION OF THE PREFERRED EMBODIMENTS

Figure 1:
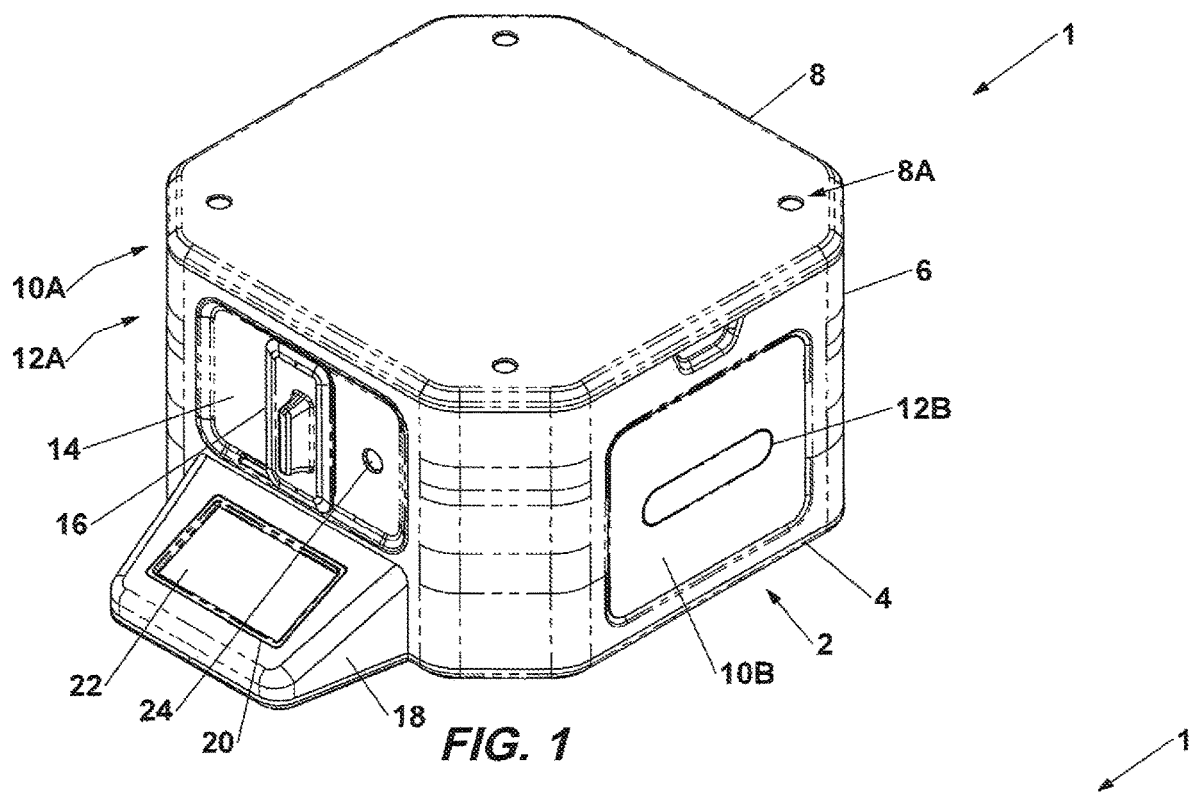
FIG. 1 is a three-quarter upper perspective view of the multiple employee personal cell phone storage and time clock apparatus and system in accordance with an embodiment of the present invention, showing the cell phone access door in the closed and locked position.
Figure 2:
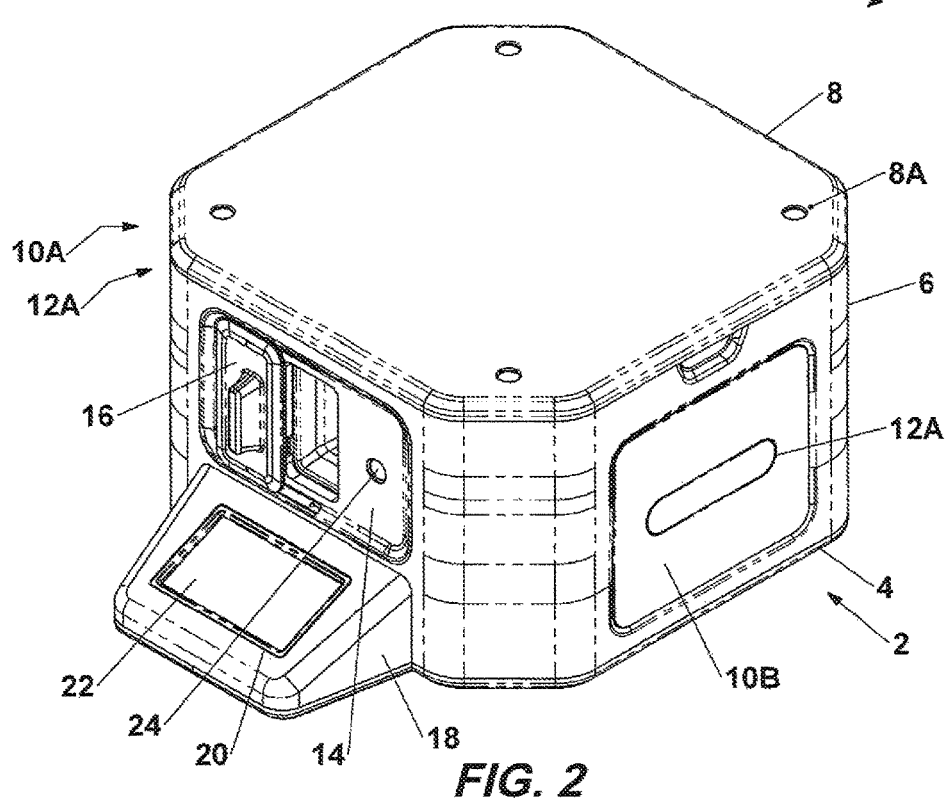
FIG. 2 is a three-quarter upper perspective view of the multiple employee personal cell phone storage and time clock apparatus and system of in FIG. 1, shown with the cell phone access door in the open position.

Referring now to the drawings and the illustrative embodiments depicted therein, FIGS. 1 and 2 generally illustrate an example multiple-employee personal cell phone secure storage and time clock apparatus and timekeeping system 1. In this first example embodiment, the multiple-employee personal cell phone secure storage and time clock machine apparatus and system 1 generally comprises a main case assembly 2 that houses a carousel therein. Main case assembly 2 includes a case base panel 4, case perimeter side panels 6, a case top panel 8, left and right outer side panels 10A and 10B, and left and right outer side logo plates 12A and 12B. The front portion of the machine includes case front panel 14, storage access door 16, and display screen surround or casing 18. The display screen surround 18 is further comprised of a display screen bezel 20 and a touch-control display screen 20. An alpha numeric LED display 24 is provided at case front panel 14.

FIG. 1 shows the cell phone storage access door 16 in the closed and locked position, while FIG. 2 shows the cell phone storage access door 16 in the unlocked and opened position.

Figure 3:
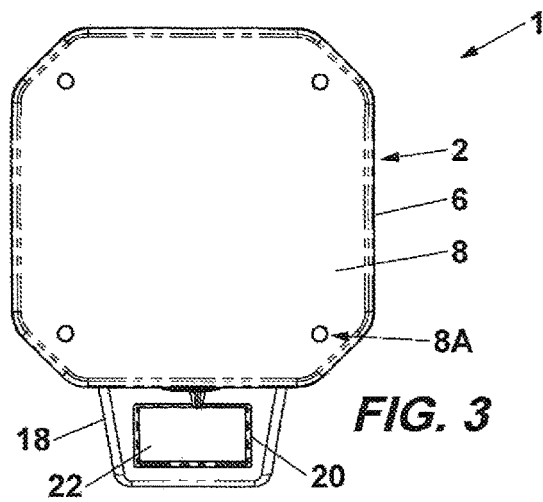
FIG. 3 is a top view of the apparatus of FIG. 1.
Figure 4:
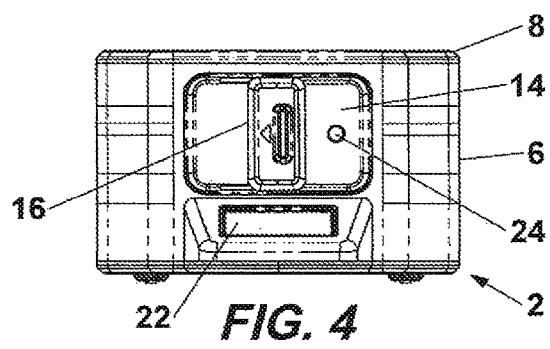
FIG. 4 is a front view of the apparatus of FIG. 1.
Figure 5:
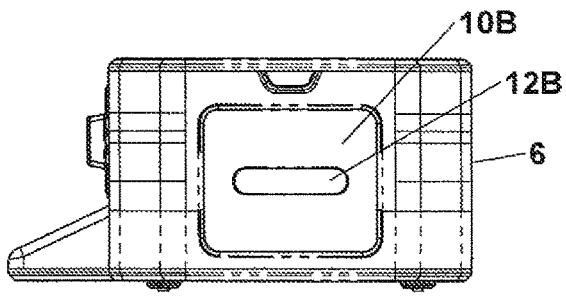
FIG. 5 is a right-side view of the apparatus of FIG. 1.
Figure 6:
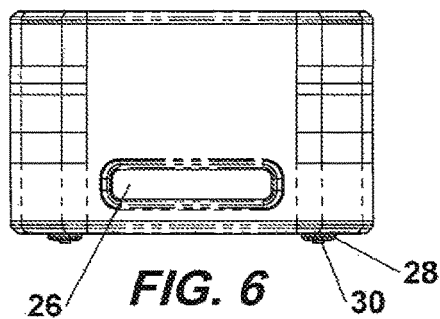
FIG. 6 is a rear view of the apparatus of FIG. 1.

FIG. 3 shows a top elevation view of the apparatus of FIG. 1. FIG. 4 shows a front view, FIG. 5 shows a right-side view, FIG. 6 shows a rear view which further shows a rear service access panel 26 at the back portion of the case perimeter side panels 6. Service access panel 26 serves as a convenient location for the routing and passage of an electrical power supply cord (not shown) to enter the case of the machine, as well as receptacle connections for various digital, analog, or fiber optic network, computer or communications interface equipment or signal conductors as needed for data collection and processing (not shown).

Figure 7:
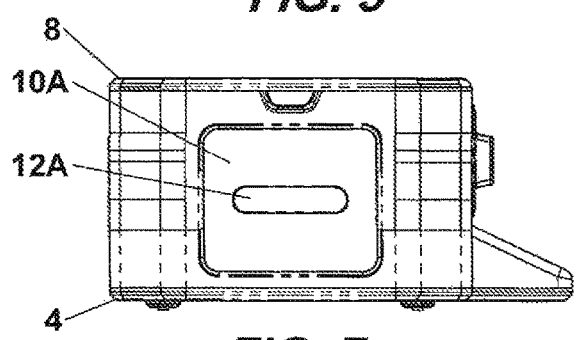
FIG. 7 is a left-side view of the apparatus of FIG. 1.
Figure 8:
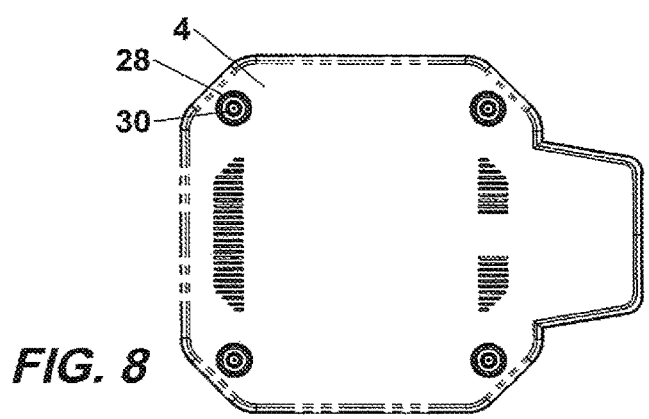
FIG. 8 is a bottom view of the apparatus of FIG. 1.

FIG. 7 shows a left side view, while FIG. 8 shows a bottom view of the machine including the base panel 4 which provides a mounting base for the entire apparatus. Base panel 4 is generally supported on any generally flat surface by four base footpads 28 and four base bumpers. These provide both optional vibration and noise absorption as well as surface traction support of the device on any generally smooth or slippery surface.

Figure 9:
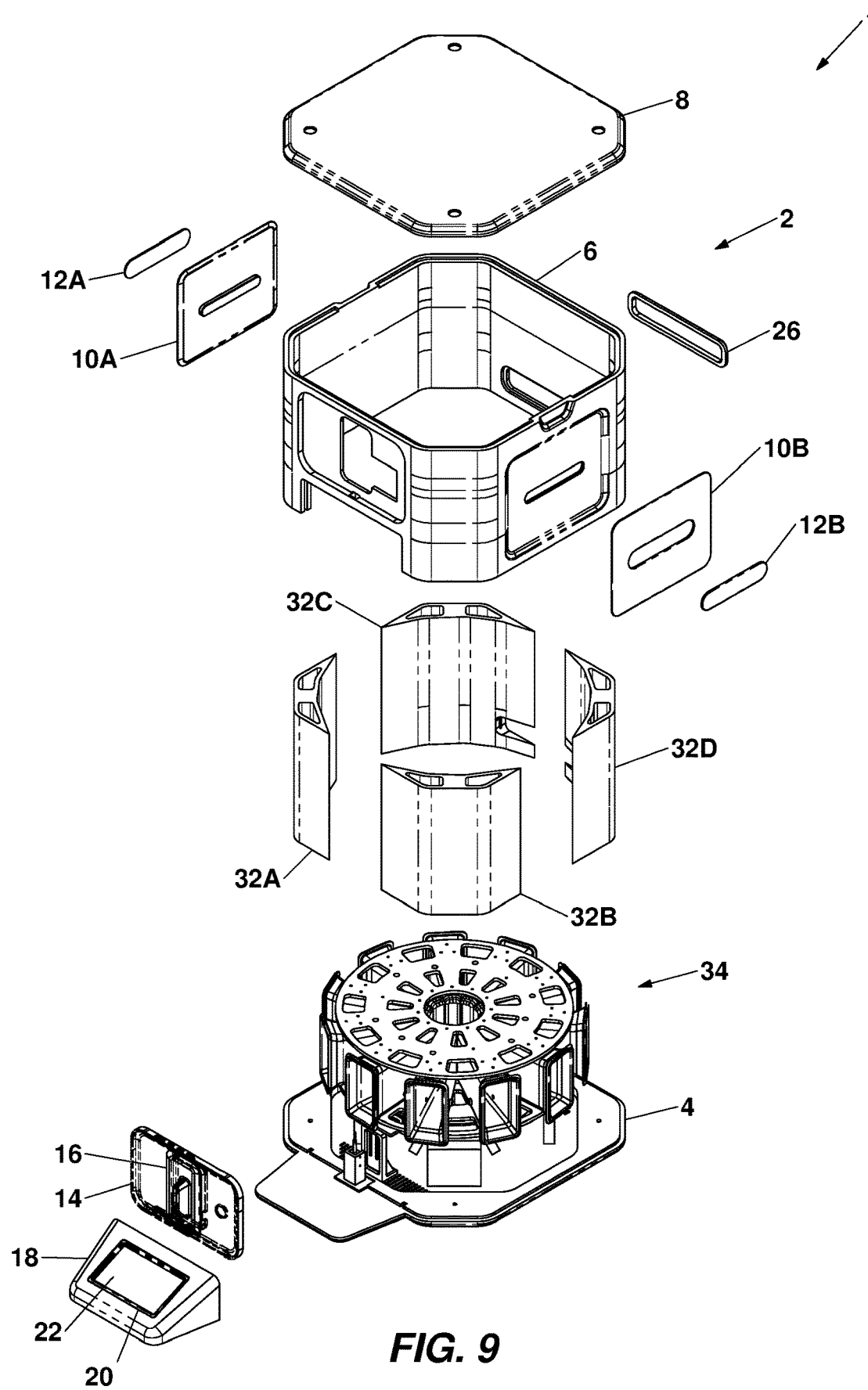
FIG. 9 is an exploded perspective view of the apparatus of FIG. 1, showing the upper and front portions of the device as partially-exploded subassemblies.

FIG. 9 further illustrates a partially exploded view of the upper portion of main case assembly 2 of the example embodiment of the present invention of FIG. 1. The interior portion of the inside corners of the main case assembly are provided with four corner fillers 32, which includes left front corner filler 32A, right front corner filler 32B, left rear corner filler 32C, and right rear corner filler 32D. These are provided to offer a more preferred square-shaped design of the main case assembly 2, which would likely otherwise be simply round. Accordingly, the four fuller corners 32 also further prevent the possibility of any of the stored cell phones from inadvertently sliding out of their respective storage slots whenever the device is in rotational operation. Carousel assembly 34 in this illustration is clearly shown as it is generally assembled. Carousel assembly 34 is rotatably mounted to case base panel 4 within main case assembly 2. Display screen surround 18 including the display screen bezel 20 and touch control display screen 22 are also shown separated from the main case assembly 2, while case front panel 14 and storage access door 16 are also shown separated.

Figure 10:
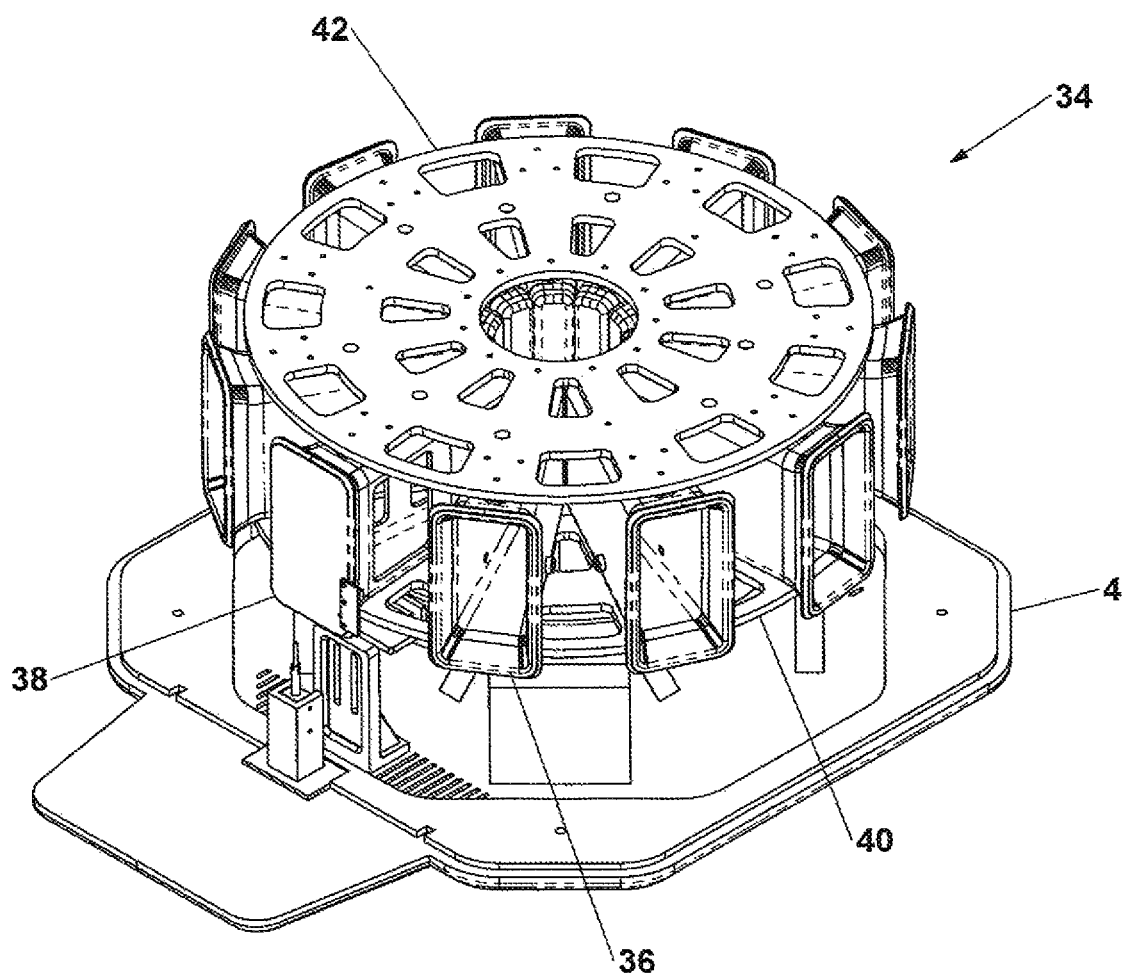
FIG. 10 is a perspective view of the lower portion of the invention apparatus shown in FIG. 9, providing a closer view of the assembled arrangement of the internal components of the device.

FIG. 10 is a more detailed and close-up illustration of the carousel assembly 34 as it is rotatably mounted to case base panel 4. Carousel assembly 34 is generally comprise of a circular array of ten generally wedge-shaped cell phone storage slots 36 and one generally wedge-shaped security guard slot 38. All ten cell phone storage slots 36 and the one security guard slot 38 are securely attached to and sandwiched between round carousel bottom plate 40 and carousel top plate 42 as a sub-assembly for free rotation about a centrally located vertical axis of rotation at the center of the main case assembly 2. It may be understood that in this series of illustrations small hardware and threaded fasteners are not shown for the sake of clarity, however a variety of fasteners and means of fastening the components thereof should be understood to exist by design to allow for proper fit and function of the present invention.

Figure 11:
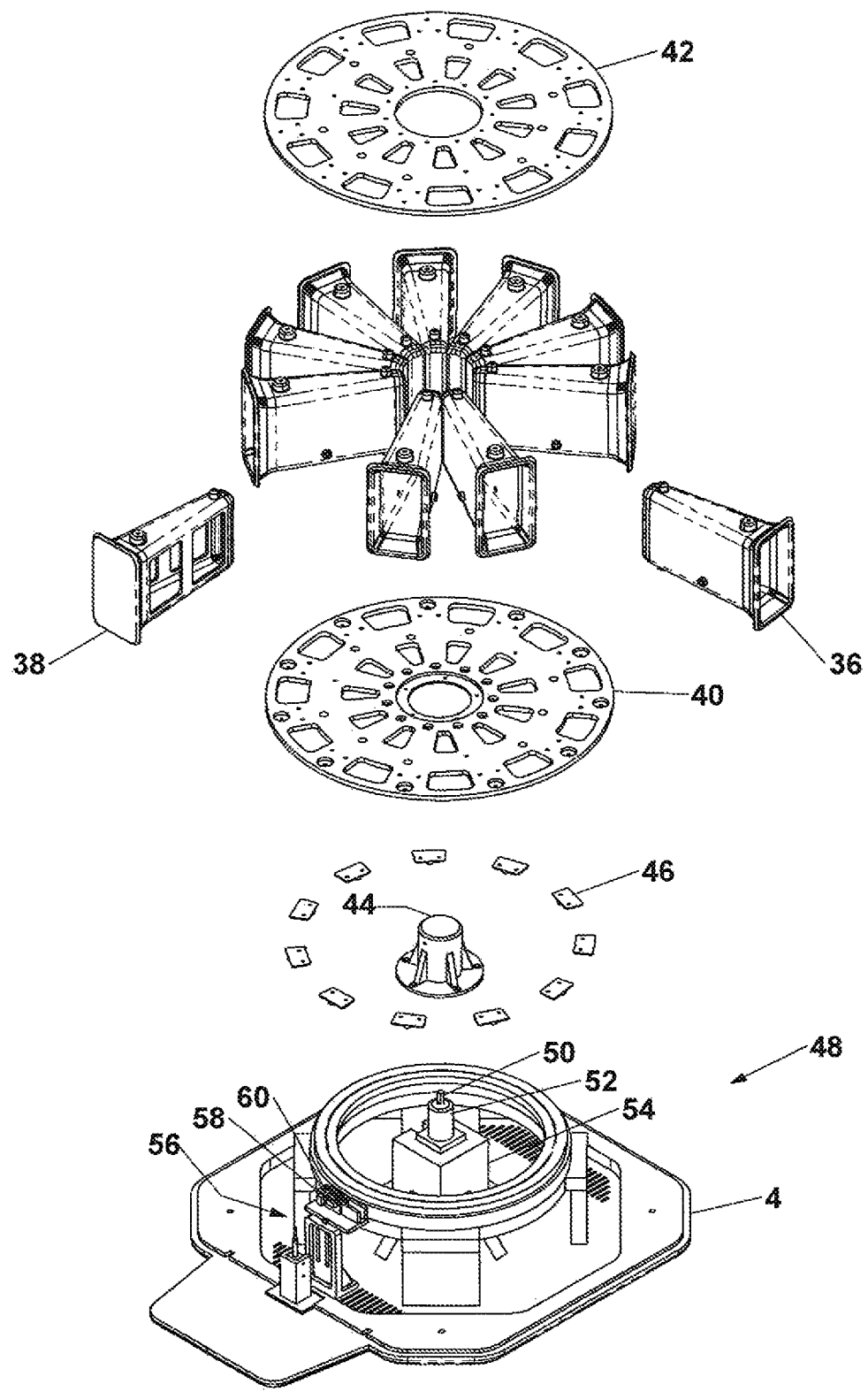
FIG. 11 is an exploded perspective view of the apparatus of FIG. 10, showing a further partially-exploded subassembly.

FIG. 11 is a further partially exploded illustration of the carousel assembly 34 shown in FIG. 10. Carousel assembly 34 is rotatably supported by carousel spindle 44 which is attached to by carousel support structure 48 securely fixed and attached to case base panel 4. The carousel is rotatably driven via a drive motor 52 that may rotate the carousel 360 degrees about the vertical axis of rotation, or that may provide less than continuous 360 degree rotation and automated reversing of the direction of rotation, to position the selected storage space or guard slot at the door. Carousel spindle 44 is attached to indexable motor drive shaft 50 of indexable motor 52. Indexable motor 52 is an electric motor generally fixed and mounted to indexable motor mounting base 54 and case base panel 4. For indexed control of stopping and starting rotation of the carousel assembly, a series of rotation position indicators 46 are positioned and attached to the bottom face of carousel bottom plate 40 in a circular array corresponding to the position of each of the cell phone storage slots 36, further including the one security guard slot 38. Each of these position indicators 46 engage a pair of electrical switches, end stop switches 58 and 60, positioned at upper portion of end stop support assembly 56, at end stop top bracket 56A, during rotation of the carousel assembly 34 when rotated by the activation of indexable electric motor 52. End stop bottom bracket 56B is securely attached to case base panel 4 to rigidly support the end stop electrical switches 58 and 60 just under and at proximity to the underside of the carousel assembly 34 as it rotates. Slots and a keyed mechanical interface between end stop bottom bracket 56B and end stop top bracket 56A are provided to allow vertical adjustment of the end stop switches 58 and 60 for proper mechanical engagement with the carousel position indicators 46.

Optionally, the carousel position indicators may comprise IR emitters or sensors, light emitters or sensors, magnetic sensors or the like, which sense a stationary emitter or element or sensor to determine the rotational position of the carousel. For example, a light emitter may be disposed at the housing, and a sensor may be disposed at each compartment, such that when a particular sensor senses the light emitted by the emitter, the system knows which compartment is positioned at the door. Optionally, the sensor may be at the housing, with each position indicator being a unique indicator, such that the sensor can discern one indicator from another to determine the position of the carousel (e.g., each indicator may have a unique barcode or the like that is scanned by the sensor).

Figure 12:
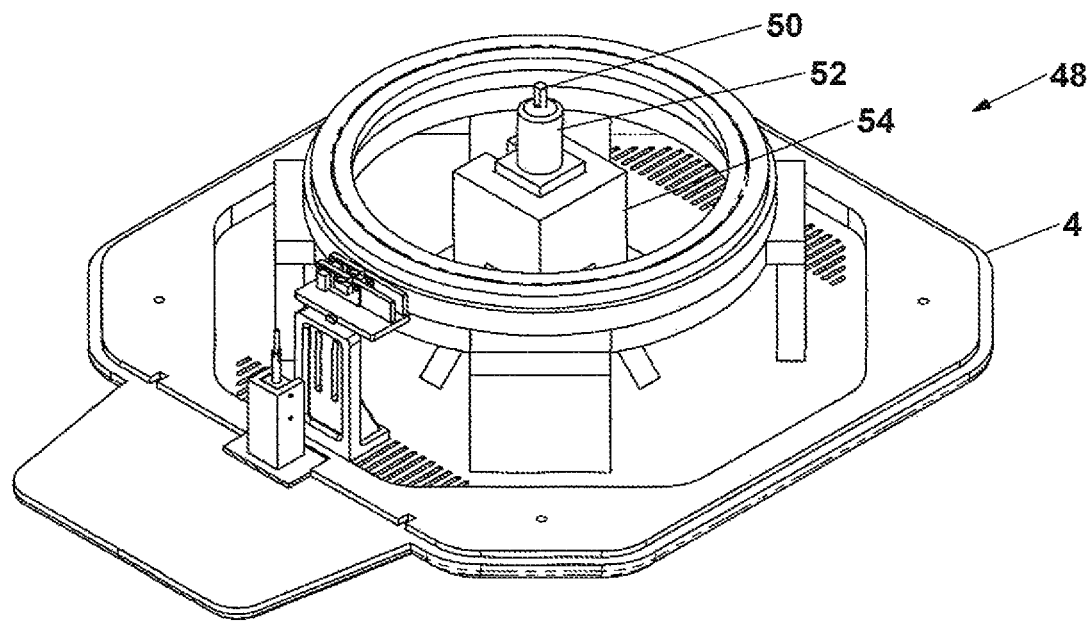
FIG. 12 is a perspective view of the lower portion of the apparatus shown in FIG. 11, providing a closer view of the assembled arrangement of the internal components.

FIG. 12 is a close-up and more detailed illustration of the carousel support structure 48 as shown in previous FIG. 11.

Figure 13:
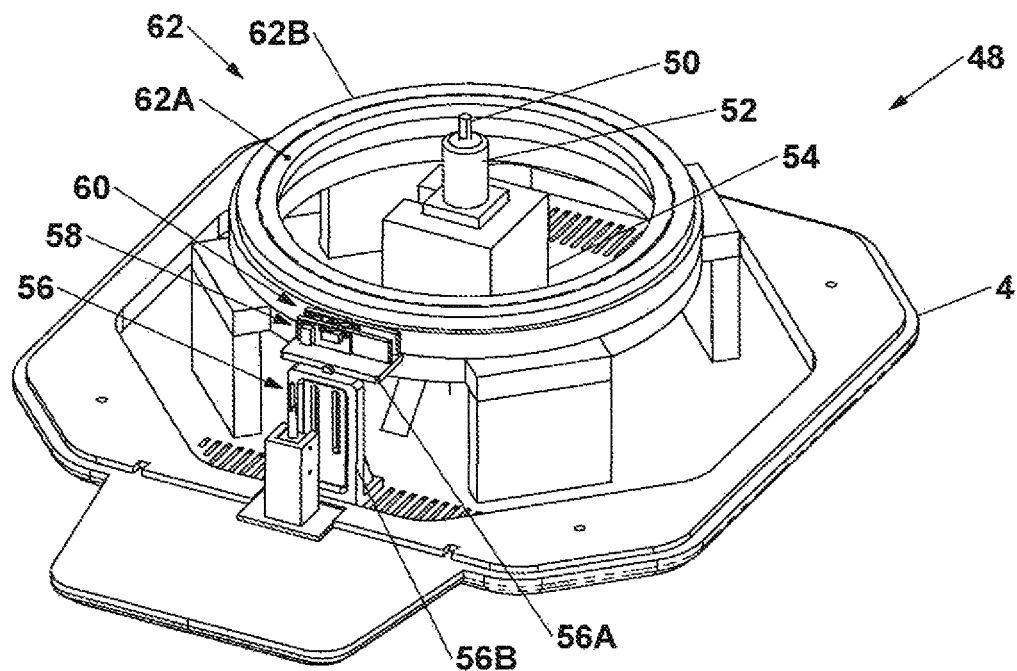
FIG. 13 is the another perspective view of the lower portion of the apparatus of FIG. 12.

FIG. 13 is another equally detailed close-up of FIG. 12 and slightly rotated for improved clarity of the structure and arrangement of the various components. Carousel support structure 48 is further comprised of a relatively large diameter open-center carousel support bearing 62. The carousel support bearing 62 (also known as a "Lazy Susan bearing" often utilized in kitchen corner cabinets) is comprised of two races; an inner race 62A and an outer race 62B. This bearing substantially supports the weight of the entire carousel assembly 34 at all times, including any cell phones stored within the cell phone security slots 36 when in use.

Figure 14:
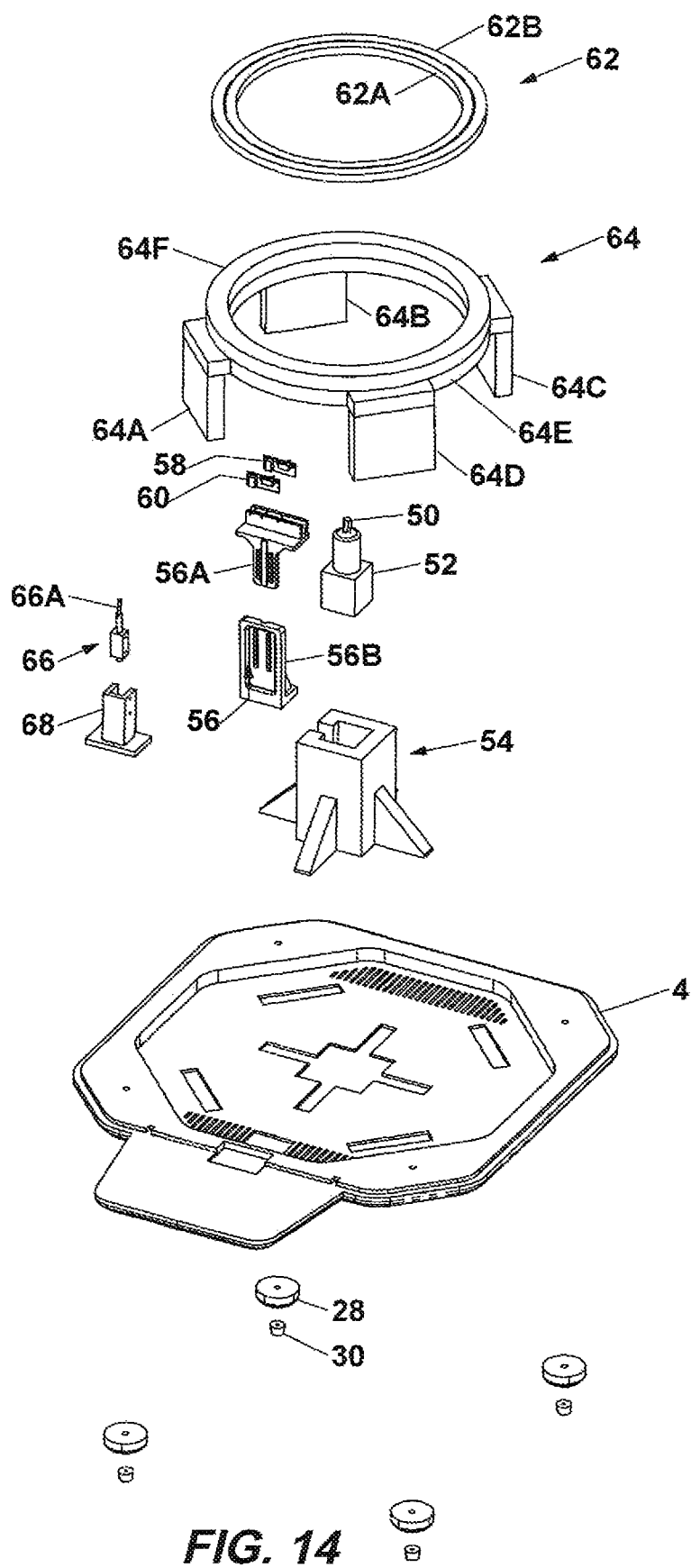
FIG. 14 is an exploded perspective view of the subassembly of FIG. 13.

FIG. 14 shows a partially exploded view of the carousel support structure 48 of previous FIG. 13. Carousel support structure 48 further includes a carousel support structure 62 that supports and attaches the carousel support bearing 62. Carousel support structure 62 is further comprised of structural block members 64A, 64B, 64C, and 64D, including carousel support ring 64E and carousel support spacer ring 64F. These components provide a fixed set-height for support of the carousel assembly 34 and carousel support bearing 62 above the case base panel 4.

Also shown in FIG. 14 is an access door lock actuator 66. This component is generally an electrically controlled solenoid that retracts the access door lock pin 66A when energized by the control system of the device. Access door lock actuator 66 is supported and fixed in place by access door lock actuator mounting bracket 68 which is further attached to case base panel 4.

Figure 15:
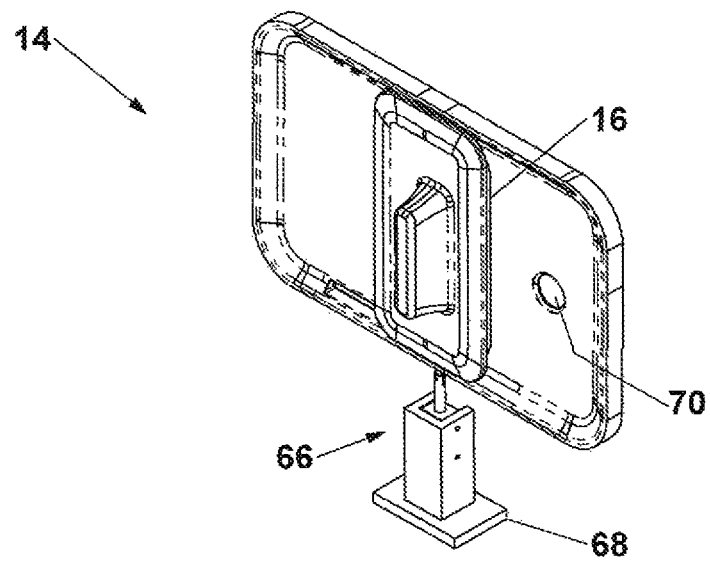
FIG. 15 is a perspective view of the case front panel, access door sub-assembly and access door lock actuator mounting bracket of the apparatus.

FIG. 15 shows the relationship between access door lock actuator 66 and case front panel 14 as a sub-assembly when the unit is assembled. Access door lock actuator 66 is fixed-mounted to case base panel 4 (as shown in the previous figures) while case front panel 14 is fixed-mounted to the front portion of case perimeter side panels 6 (as shown in the previous figures).

Figure 16:
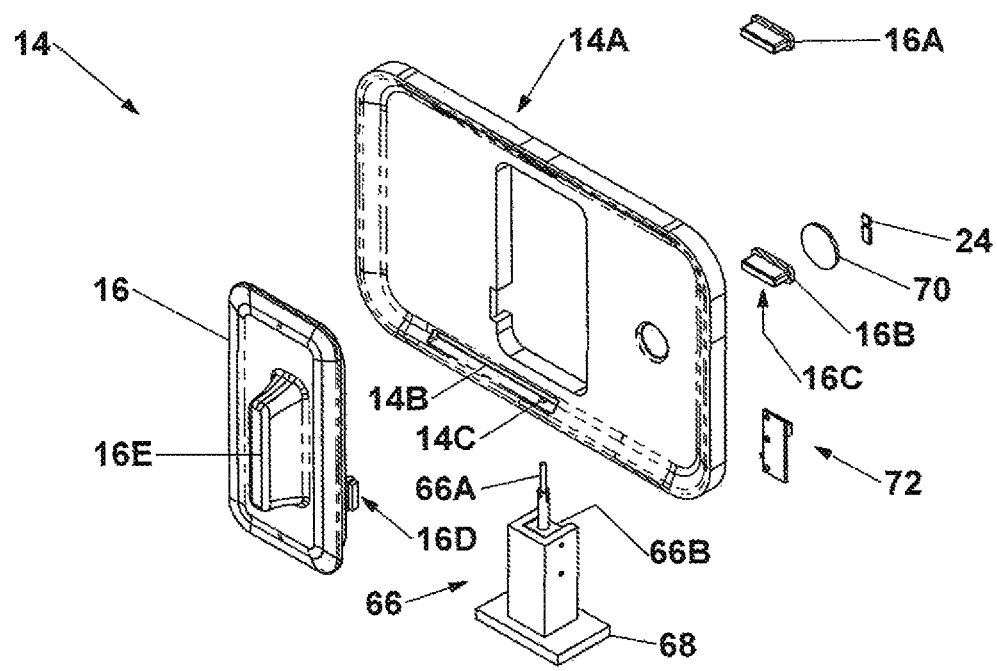
FIG. 16 is an exploded perspective view of the case front panel, access door sub-assembly and access door lock actuator mounting bracket of FIG. 15.

FIG. 16 shows an exploded view of case front panel 14, where storage access door 16 is slidably attached and captured at case front panel 14 at storage access door top slide 16A and bottom slide 16B through respective top slot 14A and bottom slot 14B. Storage access door handle 16E is provided for a user of the apparatus to both slidably open and close the storage access door 16 at storage access door handle 16E when using and accessing the device. The rearward or inside portion of case front panel 14 further includes a fixed mounting for alpha numeric LED display 24 at LED display lens 70 at case front panel LED aperture 14D. Alpha numeric LED display 24 provides a visual indication of the current position and status of the carousel assembly 34 to the user with respect to the ten individually identified cell phone storage slots 36 and the single security guard slot 38. Also attached to the reward of inside portion of the case front panel 14 is access door limit switch 72. Access door limit switch 72 senses both the closed and open positions of storage access door 16 when engaged with or disengaged respectively with storage access door limit switch tab 16D. Case front panel access door lock pin hole 14C is provided as an alignment guide for concentric slidable engagement with access door lock pin 66A. Access door lock pin 66A concentrically and slidably engages with storage access door bottom slide 16B at lock pin hole 16C (not visible at underside of 16B in FIG. 16).

When access door lock actuator 66 is de-energized, access door lock pin 66A is extended upwardly by an internal compression spring (not shown) within access door lock actuator 66 for concentric engagement of the pin 66A with both the case front panel access door lock pin hole 14C and access door bottom slide lock pin hole 16C. This securely prevents the storage access door 16 from being slidably opened by the user when the device is in parked storage or standby mode. Whenever the door lock actuator 66 is electrically energized by the control system, the access door lock pin 66A is retracted, and this allows the user to freely slide the storage access door 14 to the open position with the correct authorization code at the appropriate time and operating control state of the invention apparatus.

It is foreseeable that the storage access door 14 and control system can be further designed or configured to automatically open and close the door for the user when automatically unlocked or locked respectively, by means of yet another solenoid actuator or powered mechanism for example (not shown), and still remain within the scope of the present invention.

Figure 17:
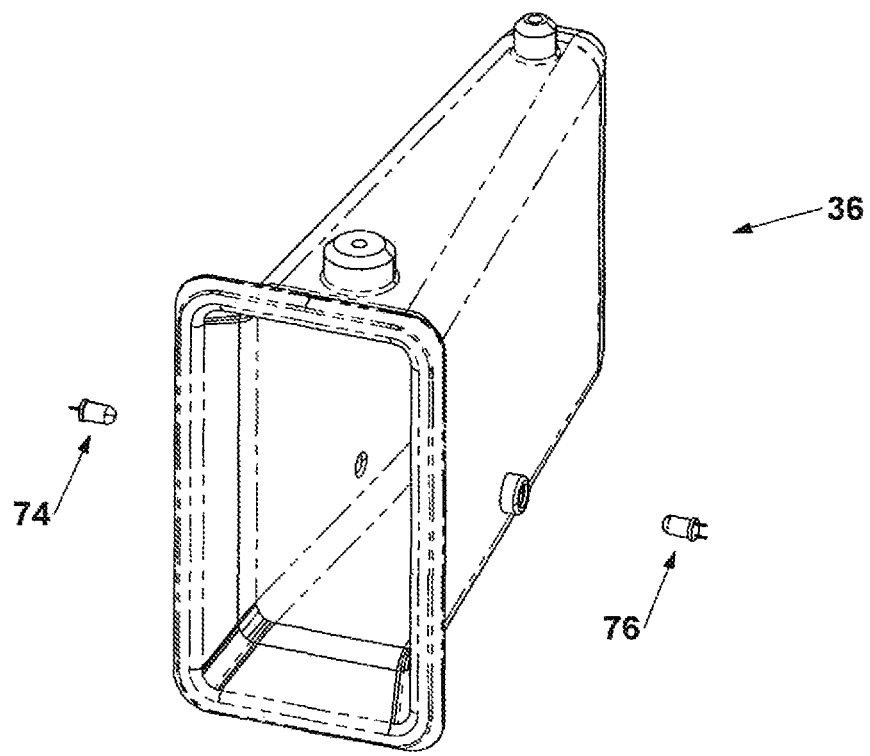
FIG. 17 is a more detailed perspective view of one of ten cell phone storage slots of the apparatus.

FIG. 17 shows a detailed perspective view of cell phone storage slot 36. This is one example of the ten security slots shown in the previous figures supported and attached to the carousel assembly 34. Cell phone security slot 36 is designed and configured to temporarily store and accommodate most, if not all, size personal communication devices anticipated to be available by the general public within present industry markets. As shown in an exploded assembly view, cell phone storage slot 36 further includes cell phone storage slot sensors 74 and 76 for cooperating detection of the presence of any personal communication device placed anywhere within the storage slot. The cell phone storage slot sensors 74 and 76 of the present invention are infrared detectors or sensing devices which when activated send an electronic signal to the control system of the apparatus indicating that a cell phone (not shown), for example, has been stored at this particular storage location within the device. Likewise the same sensors 74 and 76 detect when a cell phone is absent from this particular storage location within the device and send an opposite state electronic signal to the control system of the device. It is foreseeable and anticipated within the scope of the present invention that a variety of other types of useful sensors, sensor technologies and sensor configurations and combinations thereof can be utilized as appropriate to sense the presence or absence of a personal communication device within each of the cell phone storage slots. Likewise, combinations of multiple types if sensors can be utilized to further verify when, for example, a non-electronic object or other non-communication device has been placed within any storage slot 36 in an attempt to defeat or otherwise fool the control system, thus preferably avoiding false information from being entered into the timekeeping system and network software databases.

Figure 18:
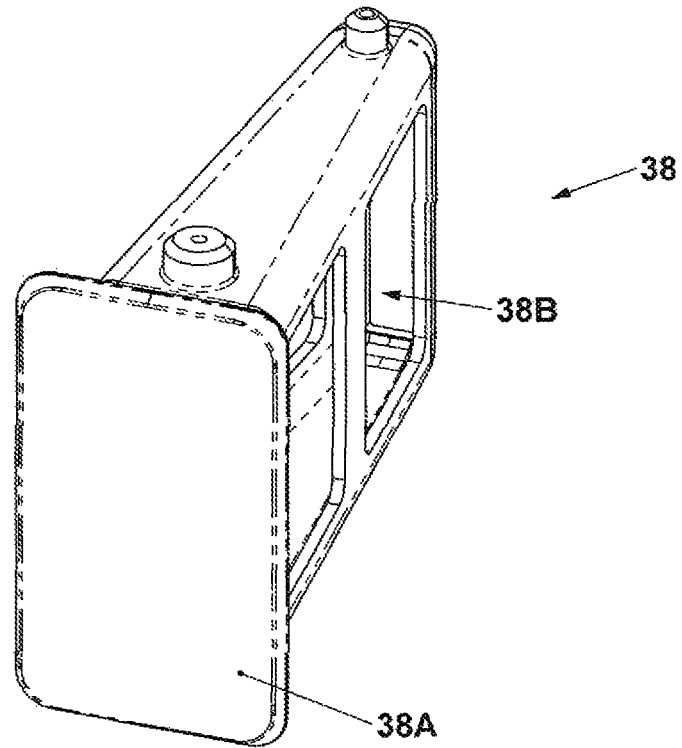
FIG. 18 is a more detailed perspective view of the single security guard slot.

FIG. 18 shows a detail perspective view of the single security guard slot 38 for comparison with cell phone storage slot 36 shown in FIG. 17. Security guard slot 38 as previously described, remains parked or stationed at and just behind the storage access door 16 by controlled rotation and indexing of the carousel assembly 34 whenever the storage apparatus is in parked to standby mode of operation. Security guard slot blocked face 38A is provided to offer an extra layer of physical security and protection to the overall personal cell phone secure storage and time clock apparatus and system 1. The security guard slot 38 is easily identified during the manufacturing and assembly process apart from the ten other cell phone security slots 36 by the existence of security guard slot thru openings 38B and the absence of sensors 74 and 76 also common to all ten of the other cell phone storage slots 36.

Figure 19:
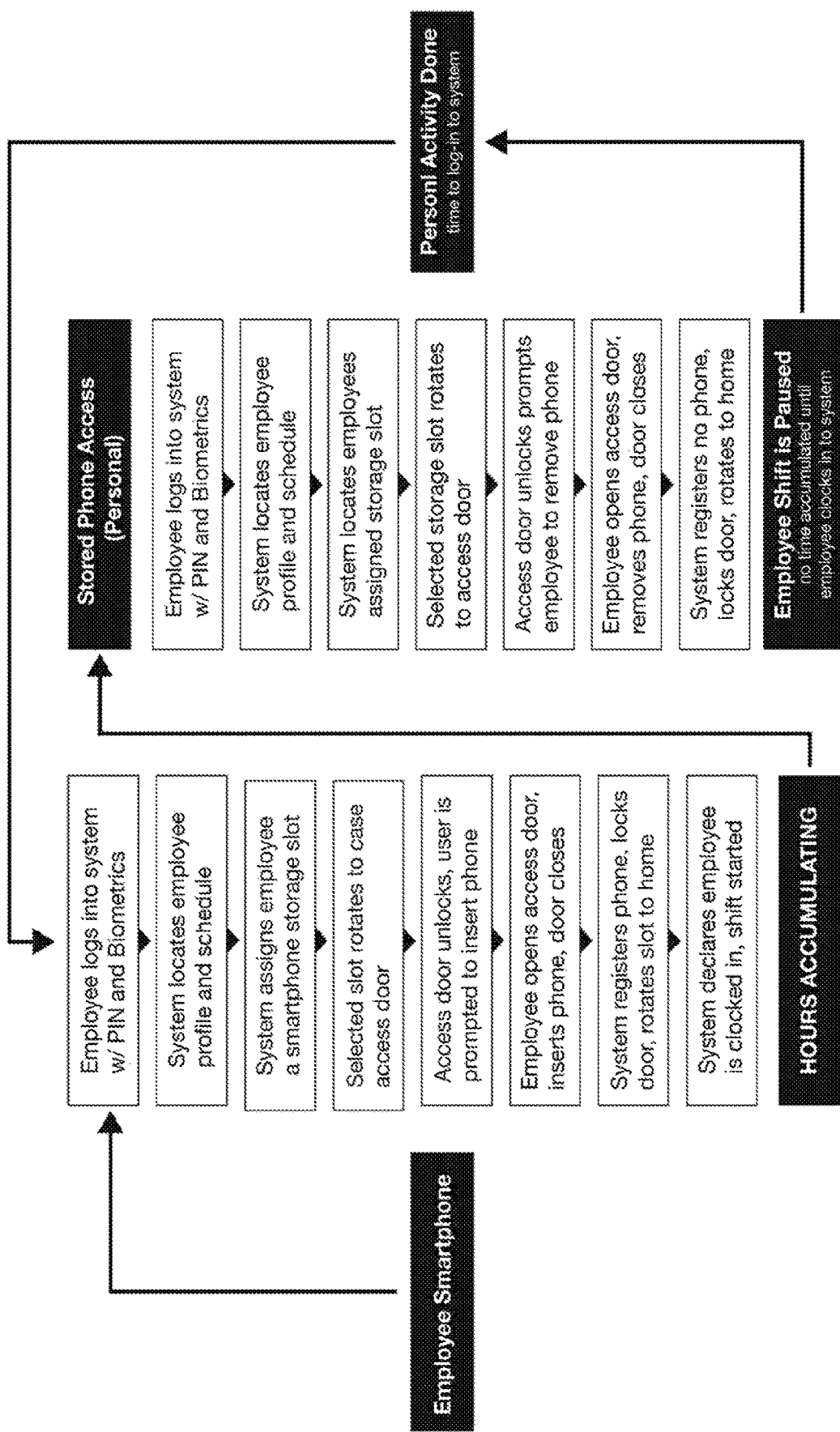
FIG. 19 is a block diagram or process flow chart describing the steps related to the apparatus and its use.
Figure 20:
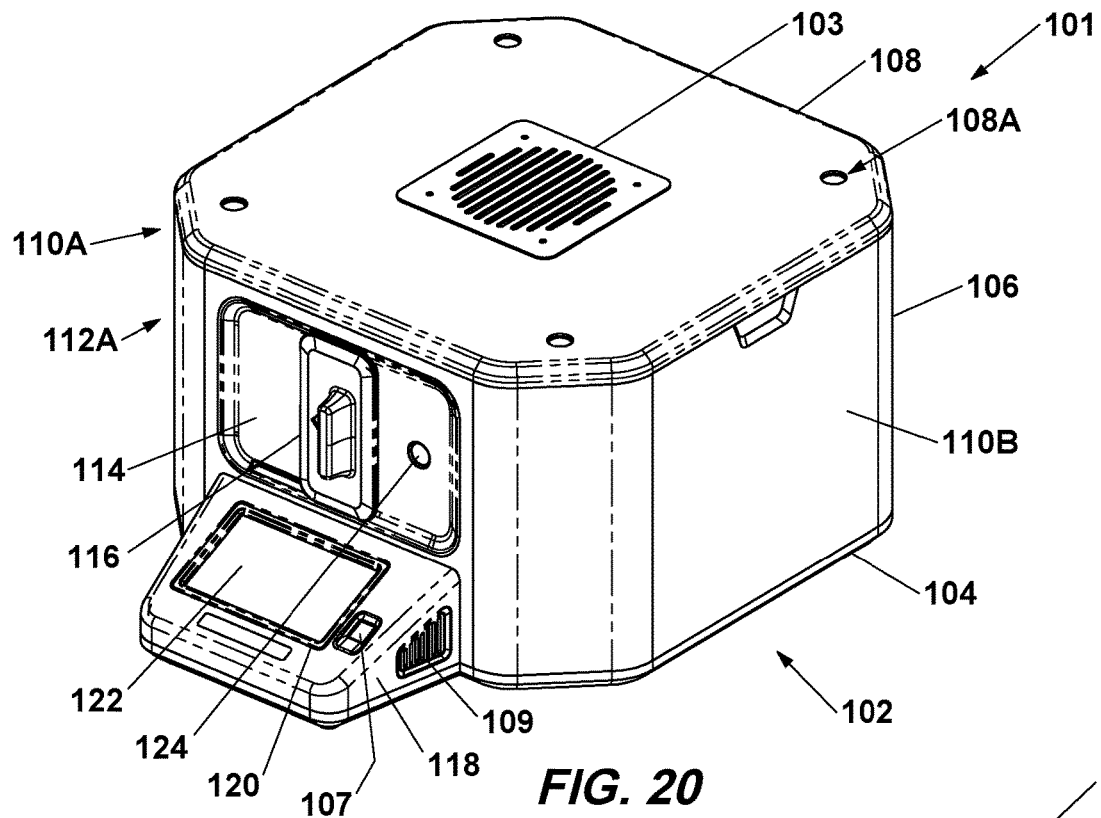
FIG. 20 is an upper perspective view of another multiple employee personal cell phone storage and time clock apparatus and system showing the cell phone access door in the closed and locked position.
Figure 21:
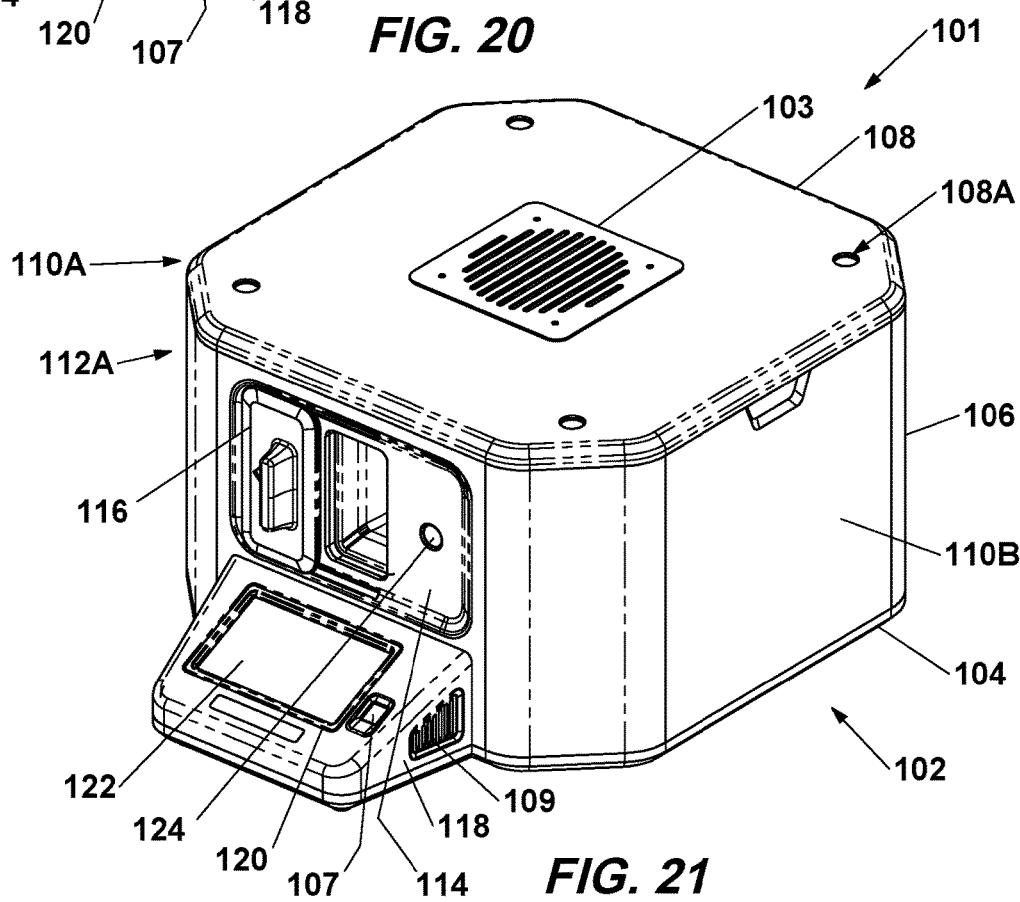
FIG. 21 is an upper perspective view of the multiple employee personal cell phone storage and time clock apparatus and system of FIG. 20, shown with the cell phone access door in the open position.

FIG. 19 offers a simplified block diagram or process flow chart describing the essential steps related to the present invention and its use. A simple and somewhat detailed explanation is provided within the figure illustration itself. Optionally, after the employee opens the access door, if the employee does not insert their device within a period of time (e.g., 30 seconds), the unit will cancel the log-in attempt and return to the home screen.

It should be further understood that the present invention, the personal cell phone secure storage and time clock apparatus and system 1, is readily scalable in that multiple complete apparatus devices may be both electrically connected together my means of communication and power cables as well as stacked vertically by nesting of units at and between the four base footpads 28 and base bumpers 30 with the four case top panel stacking depressions 8A (FIG. 3) of each main case assembly 2. In this way an entire array of units may be utilized to accommodate any number of employees for example in a large business or organization.

It is also foreseeable that small and simple single-user standalone individual units sufficient to temporarily store a single personal communication device or cell phone, for example, may be installed or configured at an individual workers desk or work station. Any number of these "personal sized units" may be distributed at desks throughout a business office environment, for example, and may be electrically connected for network communication with an overall employee timekeeping system for the control and use of personal cell phones on a scalable network system either large or small.

Thus, the mobile device storage and tracking device or system of the present invention provides secure storage of employees' mobile devices during work hours. Each employee or user is identified when they actuate the user input and the carousel then moves the storage space associated with that user to the door and unlocks the door. The user can open the door (or the door can be automatically opened when unlocked) to place their device in that storage space or to remove their device from that storage space. The apparatus tracks or monitors the amount of time during the work day that each user has had their mobile device in their position (i.e., not stored in the apparatus), and can generate an alert or report when any given employee or user exceeds a targeted threshold time period. The user or employee can remove their device from the carousel and place their device in the storage space of the carousel multiple times throughout the work day, with the apparatus and system tracking/monitoring such actions and determining the cumulative time in which the device is not stored in the storage space (following the initial placement of the device in the storage space for that day). When the device(s) is/are stored in the storage spaces, the apparatus is securely locked so that the stored devices cannot be accessed by a non-authorized user. Also, even if a user is authorized to access the apparatus, that user can only access the storage space associated with that user (because that is the only storage space at the door area and the only storage space that can be accessed at the door), and cannot access other storage spaces (since the other storage spaces are at positions not aligned with the door and are thus not accessible).

Figure 22:
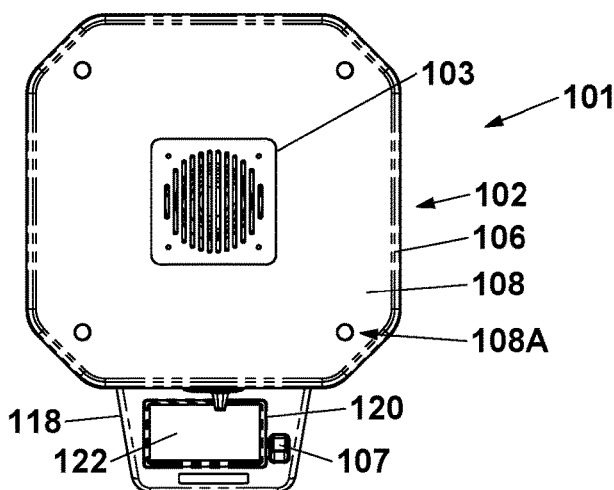
FIG. 22 is a top view of the apparatus of FIG. 20.
Figures 23, 24:
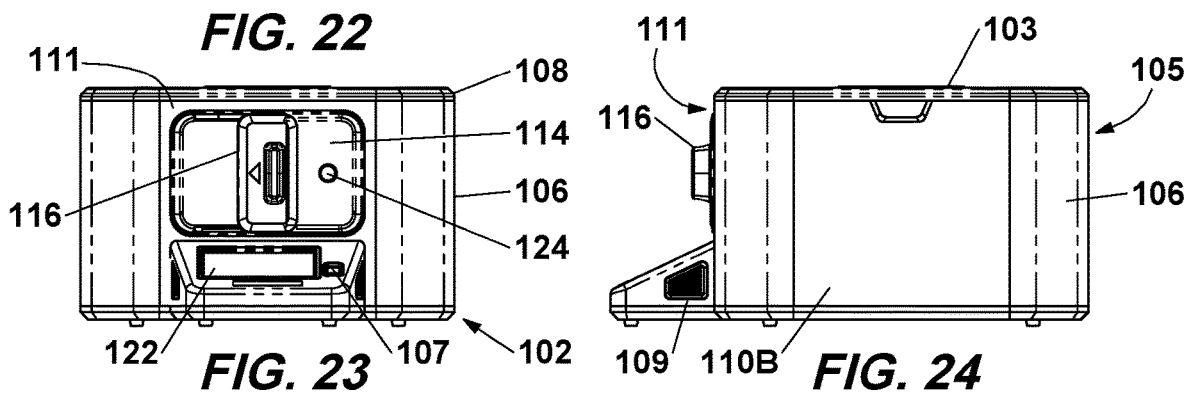
FIG. 23 is a front view of the apparatus of FIG. 20.
FIG. 24 is a right-side view of the apparatus of FIG. 20.
Figures 25, 26:
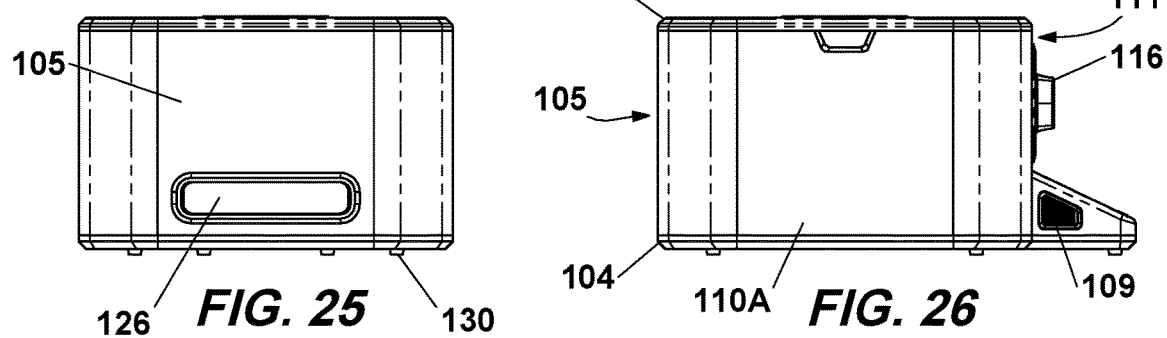
FIG. 25 is a rear view of the apparatus of FIG. 20.
FIG. 26 is a left-side view of the apparatus of FIG. 20.
Figure 27:
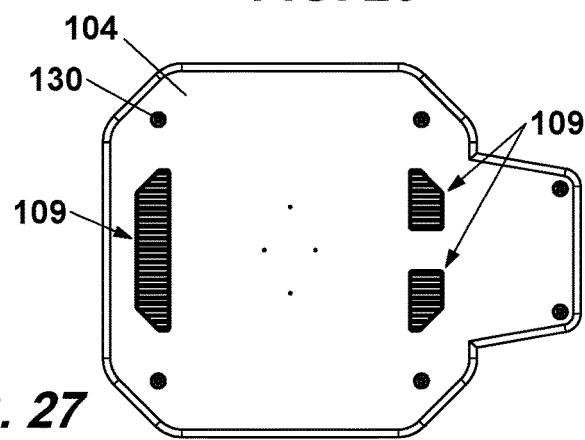
FIG. 27 is a bottom view of the apparatus of FIG. 20.
Figure 28:
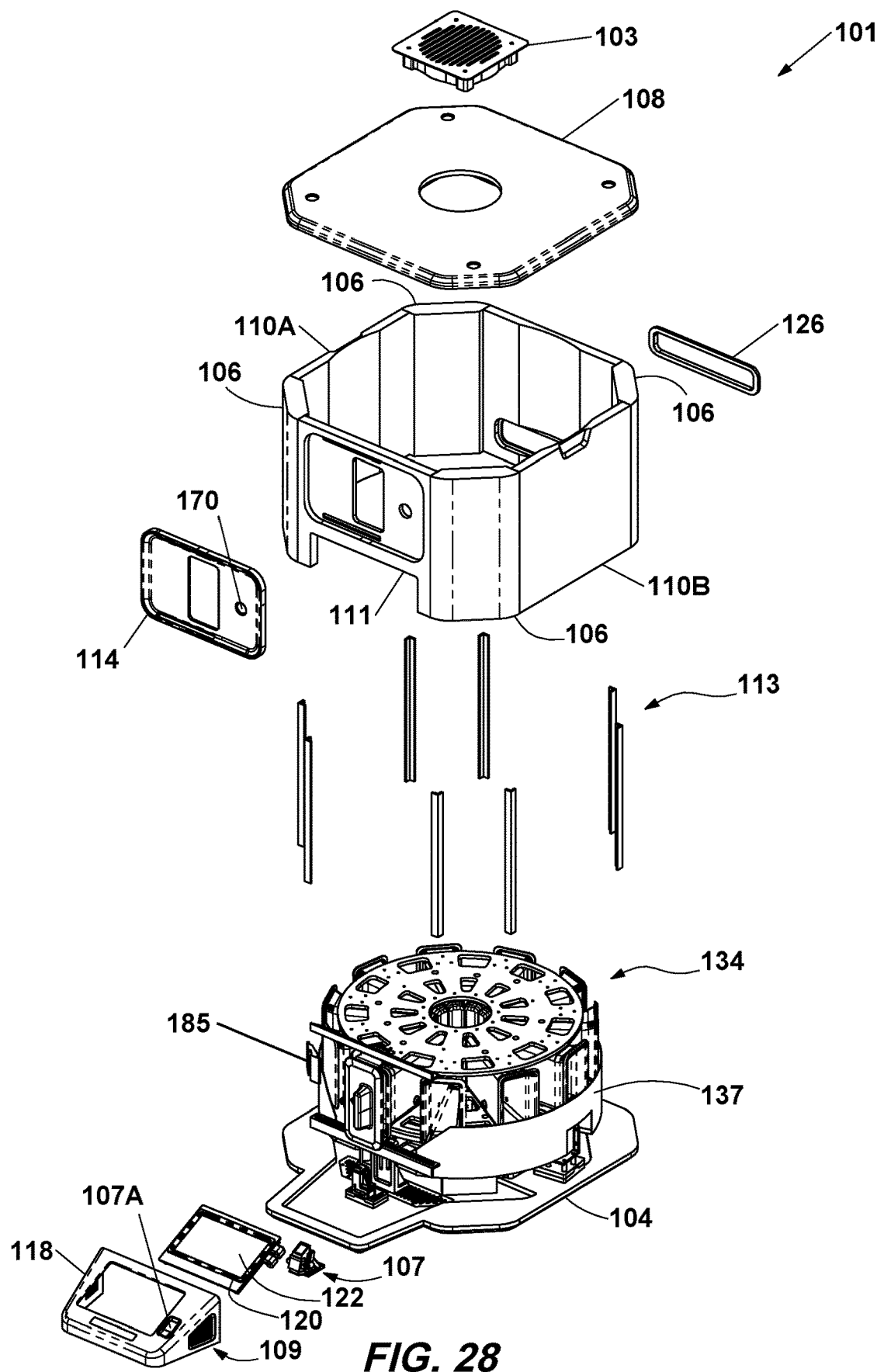
FIG. 28 is an exploded perspective view of the apparatus of FIG. 20, showing the upper and front portions of the device as partially-exploded subassemblies.
Figure 29:
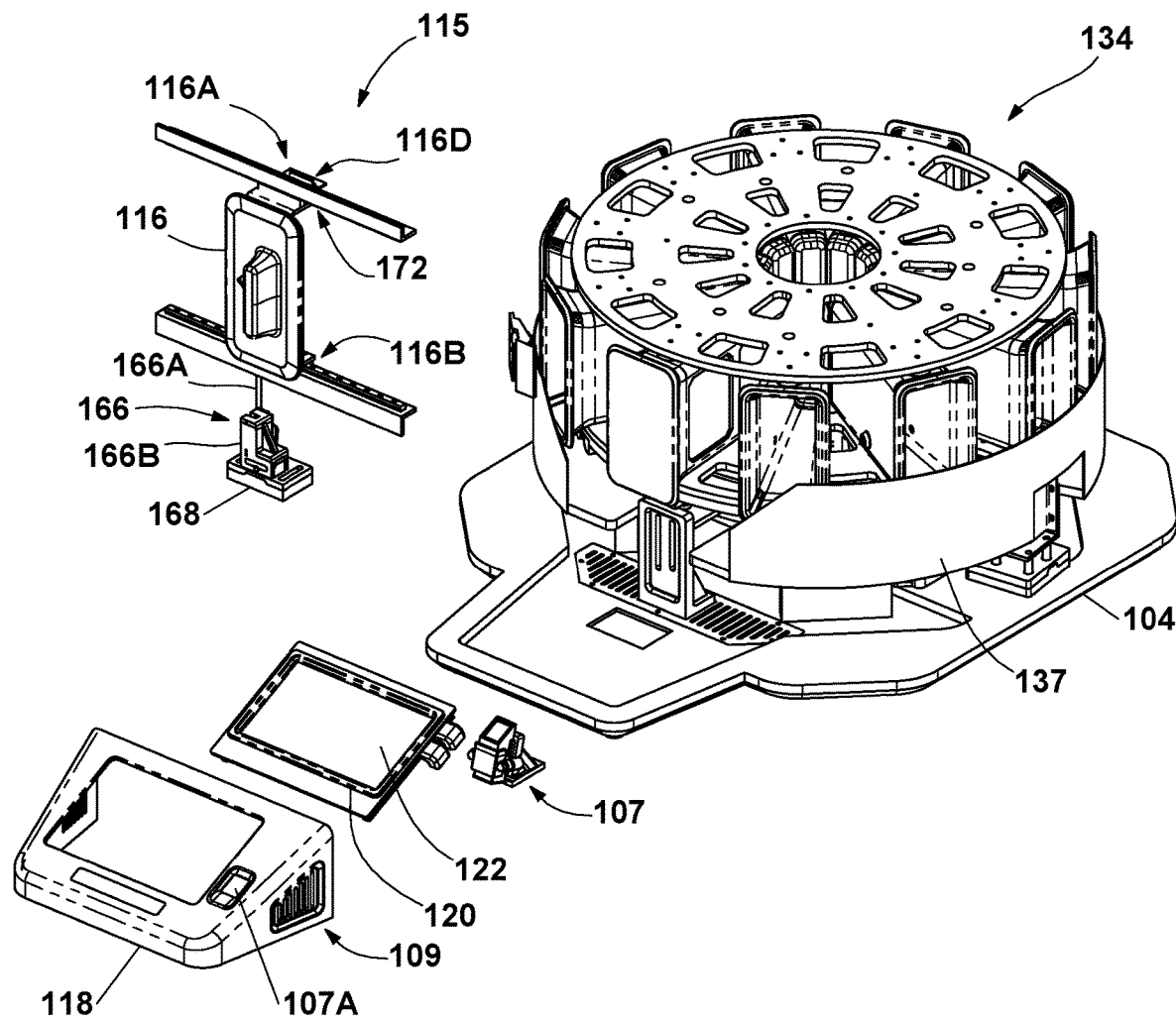
FIG. 29 is a perspective view of the lower portion of the invention apparatus shown in FIG. 28, providing a closer view of the assembled arrangement of the internal components of the device, and showing the storage access door and scanner access port (where a user may position their finger to be scanned by a finger print identification scanner)
Figure 30:
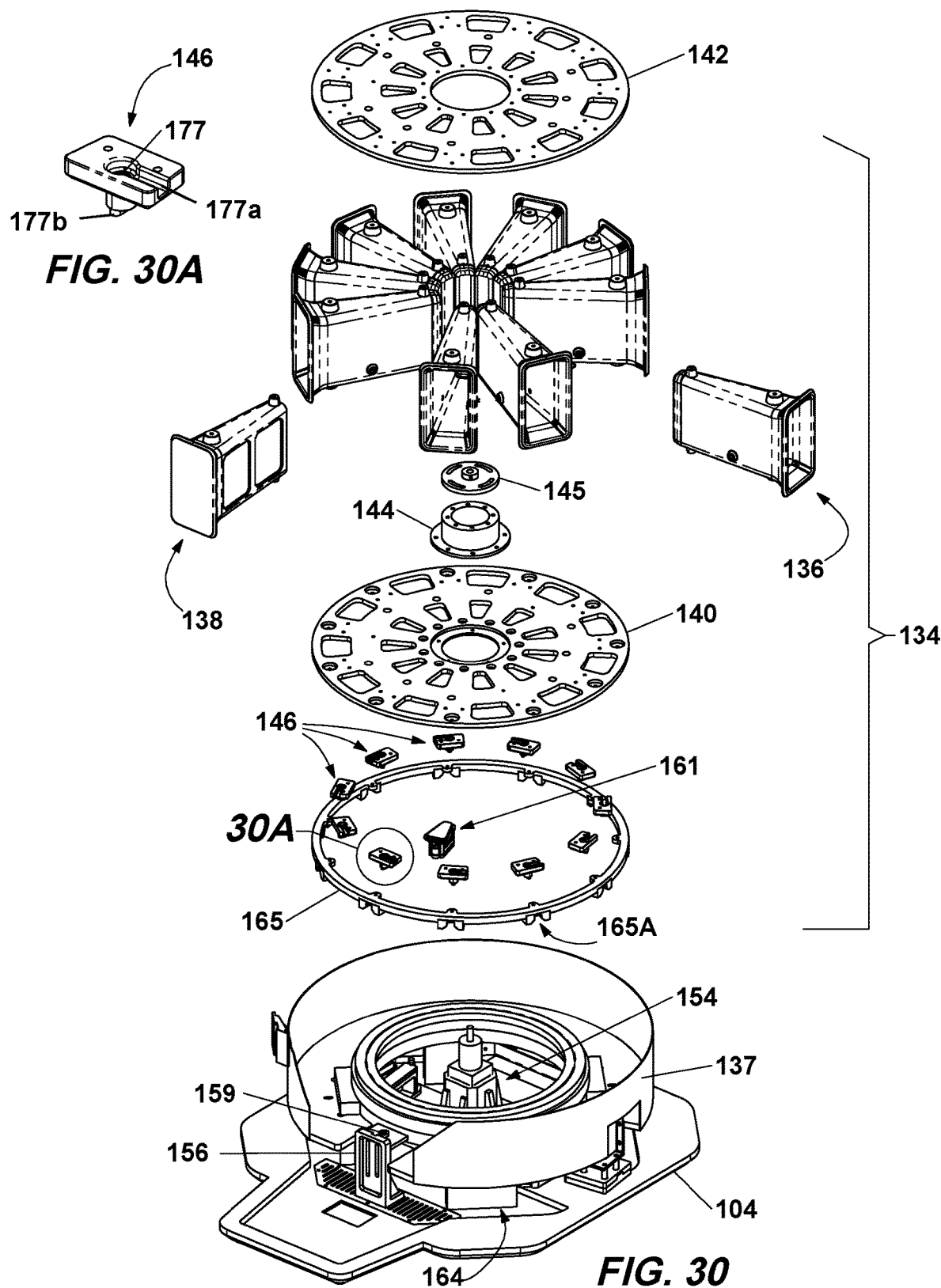
FIG. 30 is an exploded perspective view of the apparatus of FIG. 29, showing a further partially-exploded subassembly.
Figure 31:
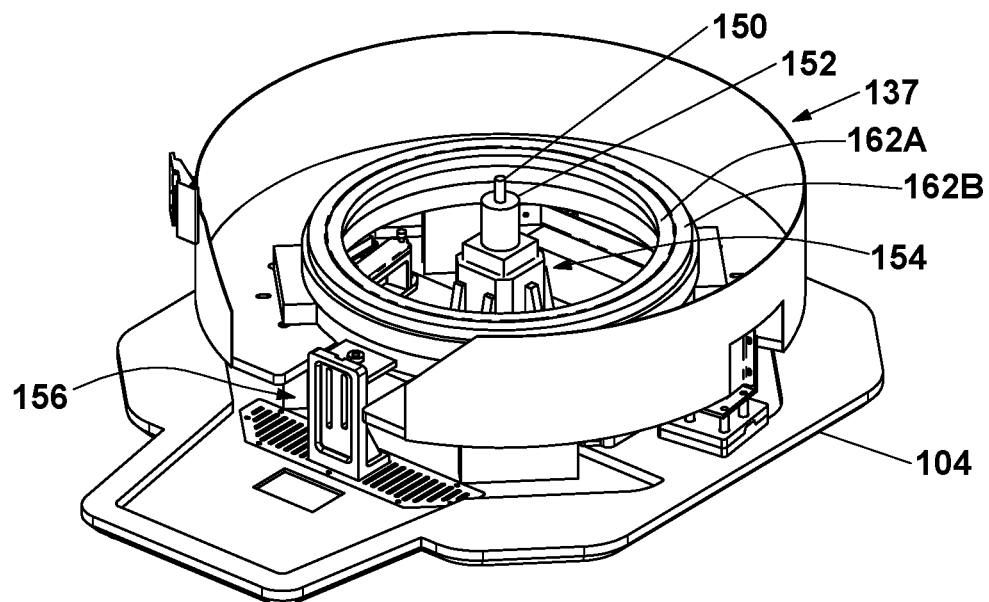
FIG. 31 is a perspective view of the lower portion of the apparatus shown in FIG. 30, providing a closer view of the assembled arrangement of the internal components.
Figure 32:
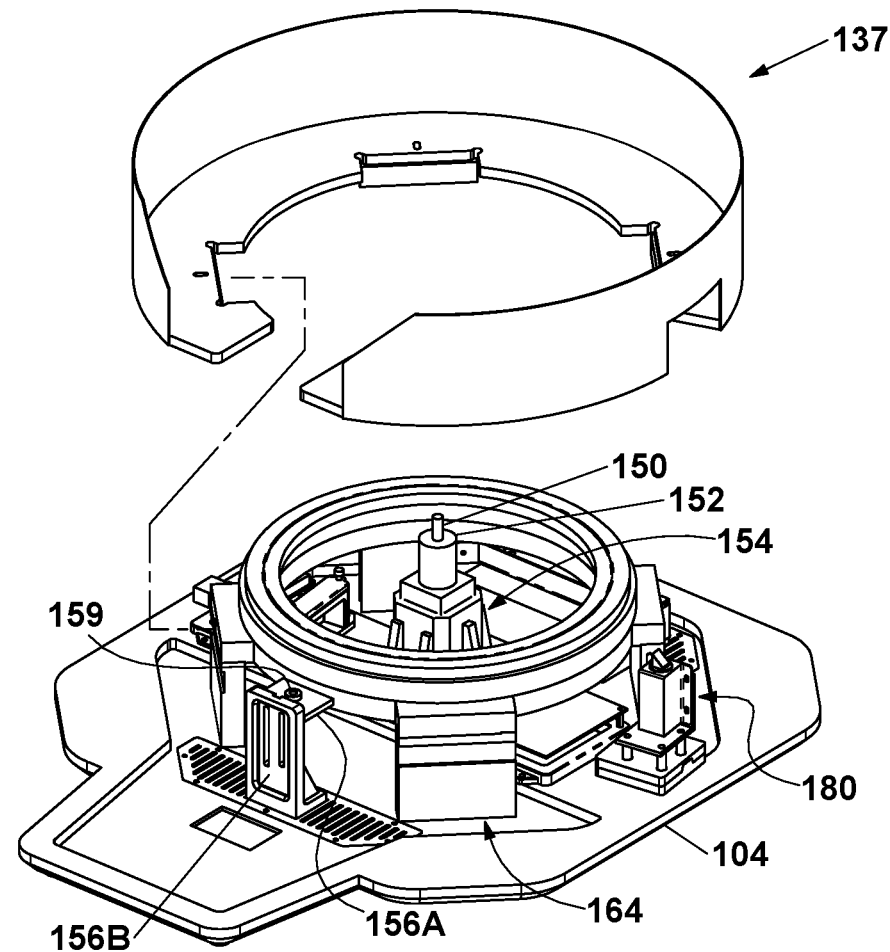
FIG. 32 is the another perspective view of the lower portion of the apparatus of FIG. 31, shown with the storage slot security barrier removed so as to be above the lower portion.

Optionally, and with reference to FIGS. 20-37, another mobile device storage and tracking device or system 101 provides additional features, such as a fingerprint scanner and a camera, as discussed below. The mobile device storage and tracking device or system 101 may be otherwise similar to the mobile device storage and tracking device or system or storage and time clock apparatus and timekeeping system 1, discussed above, such that a detailed discussion of the storage and time clock apparatus and timekeeping system 101 need not be repeated herein. The similar components and features of the storage and time clock apparatuses and timekeeping systems are shown with like reference numbers, with 100 being added to the components and features of the storage and time clock apparatus and timekeeping system 101 in FIGS. 20-37. FIG. 22 shows a top elevation view of the apparatus, while FIG. 23 shows a front view, FIG. 24 shows a right-side view, FIG. 25 shows a rear view which further shows a rear service access panel 126 at the back portion 105 of the case perimeter side panels 106.

The storage and time clock apparatus and timekeeping system 101 includes the biometric scanner 107, which comprises a finger print identification scanner that scans a user's fingerprint to identify the particular user. The scanner 107 is positioned at or near the control panel at a scanner access port 107A, such as at the display screen surround or casing 118 (FIGS. 20, 21, 28 and 29), such that a user can place their finger at the scanner to be identified. The apparatus further includes a case cooling fan 103 and a case cooing vents 109. A wiring harness support clamp 161 is disposed at the carousel plate and a wiring harness support clamp 183 is disposed at the case. The carousel position indicators 146 include a position sensor/indicator 177 disposed in a port of the indicator with each indicator including an electrical wire channel 177a and a sensor window 177b (FIG. 30A). The base plate 104 includes pre-cut reliefs or depressions to provide ease of manufacturing during the assembly process. The components may be secured by fasteners, adhesives or similar methods.

The device 101 also includes a device sensor 174, 176 (FIG. 36) disposed at mounting ports at each compartment that senses presence of a mobile device in the respective compartment. For example, the sensor may comprise an infrared or light sensor that determines presence of a device when the light emitted by an emitter at one side of the compartment is not received by a receiver at the other side of the compartment (due to the light being blocked by the mobile device). Optionally, the device 101 may include a camera 185 at a camera mount bracket 186 (FIGS. 28 and 35) positioned at the housing or case that views the storage compartment at that location, with a light source 187. The device may process image data captured by the camera to determine or confirm the presence of a mobile device in that compartment. For example, the camera may be disposed near the door to capture images of the compartment positioned at the door to determine whether or not the mobile device is in the compartment after the door has been closed. Optionally, other sensing devices may be used to confirm presence of the mobile device in the compartment, such as a pressure sensor or the like in each compartment.

Figure 34:
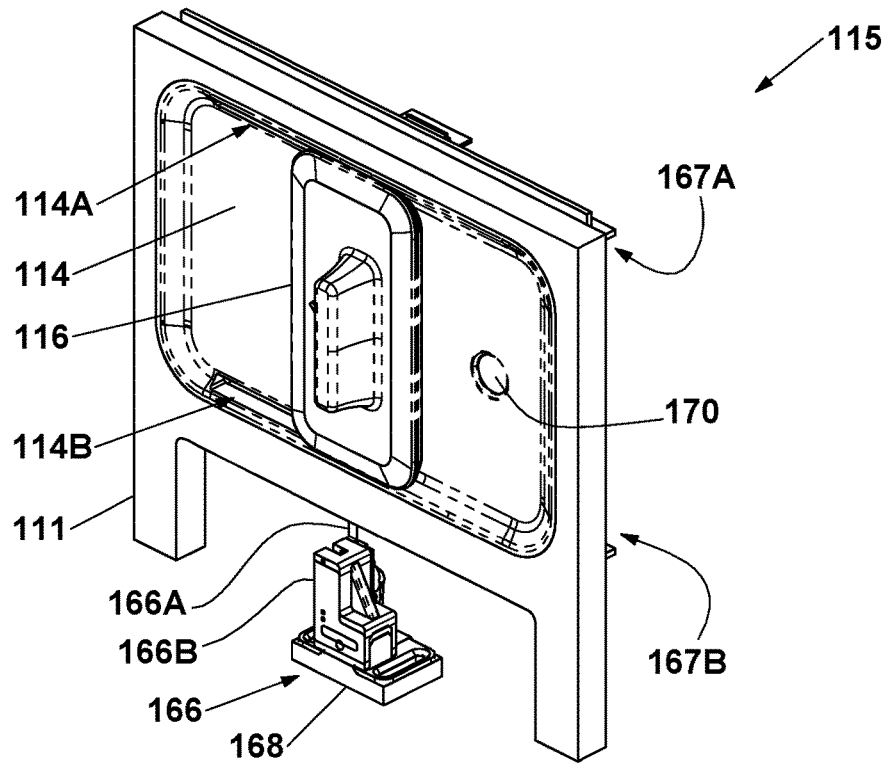
FIG. 34 is an outside perspective view of the case front panel, access door sub-assembly and access door lock actuator mounting bracket of the apparatus.
Figure 35:
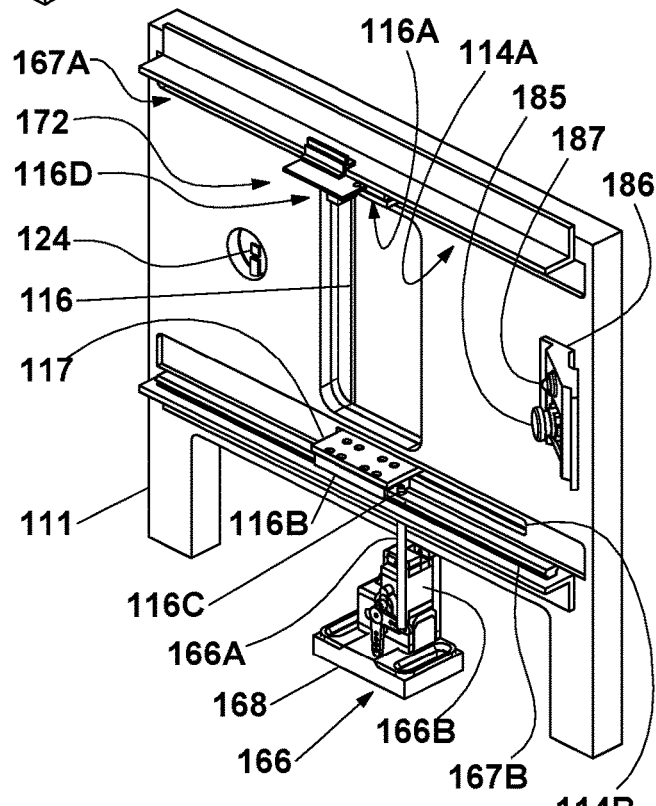
FIG. 35 is an inside perspective view of the case front panel, access door sub-assembly and access door lock actuator mounting bracket of FIG. 34.
Figure 36:
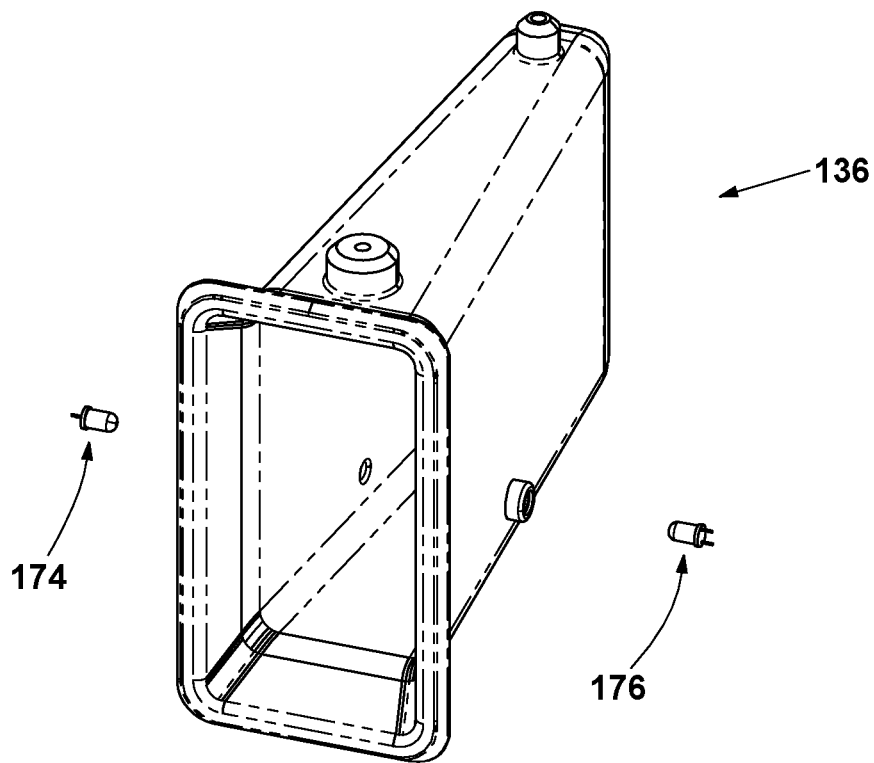
FIG. 36 is a more detailed perspective view of one of ten cell phone storage slots of the apparatus.
Figure 37:
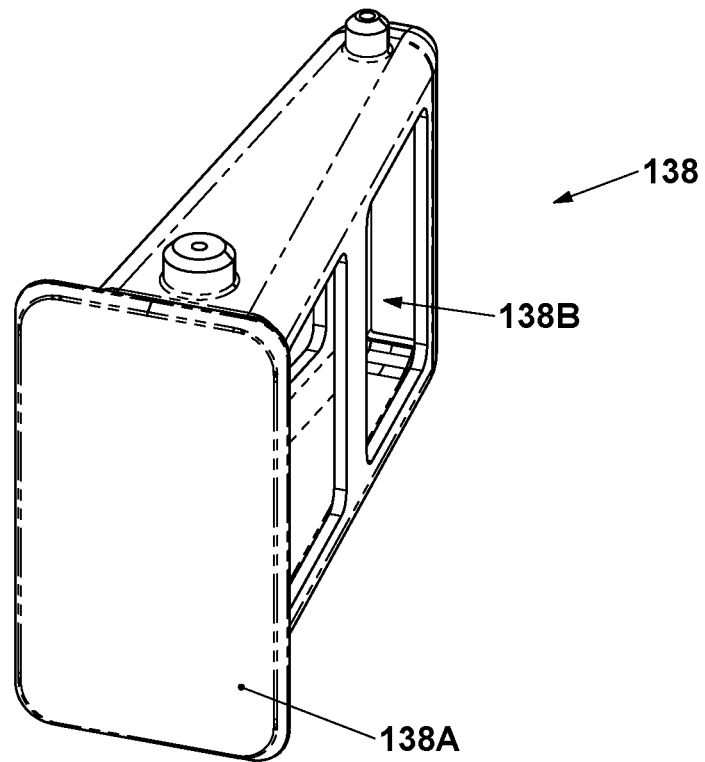
FIG. 37 is a more detailed perspective view of the single security guard slot.

As shown in FIGS. 34 and 35, the door 116 is locked via a lock actuator 166, which, when actuated to lock the door, extends a locking pin 166A (such as via a lock solenoid 166B) into a lower part or support of the door to lock the door in position relative to the forward panel 111 of the case. The door, when unlocked, slides (such as via rollers or slide bearings 116A, 116B at the upper and lower slide rails 167A, 167B of the door assembly 115) along upper and lower channels or rails at the inner side of the panel 111 (with the door movable at the outer side of the panel and thus graspable by a user to open and close the door when it is unlocked). In addition to the user or operator alternately manually sliding open and then closing the storage access door 116, the apparatus may optionally provide automatic opening and/or closing of the door. For example, the apparatus may include the necessary components and electromechanical actuators to entirely automate the opening and closing of the storage access door based upon commands and/or responses provided at the touch access control panel 122 and/or by an optionally separate control button or user response input device. This functional feature would be beneficial in instances for example, where the operator may inadvertently leave the machine and walk away with the storage access door 116 left in the open position. In such a situation, the apparatus may automatically close and lock the door after a period of time has elapsed.

The device 101 also includes a storage slot security barrier 137, which may replace the case corner filler components of device 1, to prevent cell phones or contents of the storage slots from inadvertently falling out of the slots during operation of the carousel. The barrier 137 comprises a wall that partially circumscribes the carousel (with an opening at the door location) and a base that attaches at the base or non-movable support around the carousel (such as via four aluminum brackets or the like). The device includes a plurality of case interior corner supports 113 (the case panels may be optionally joined and secured with fasteners and/or adhesives).

Figure 33:
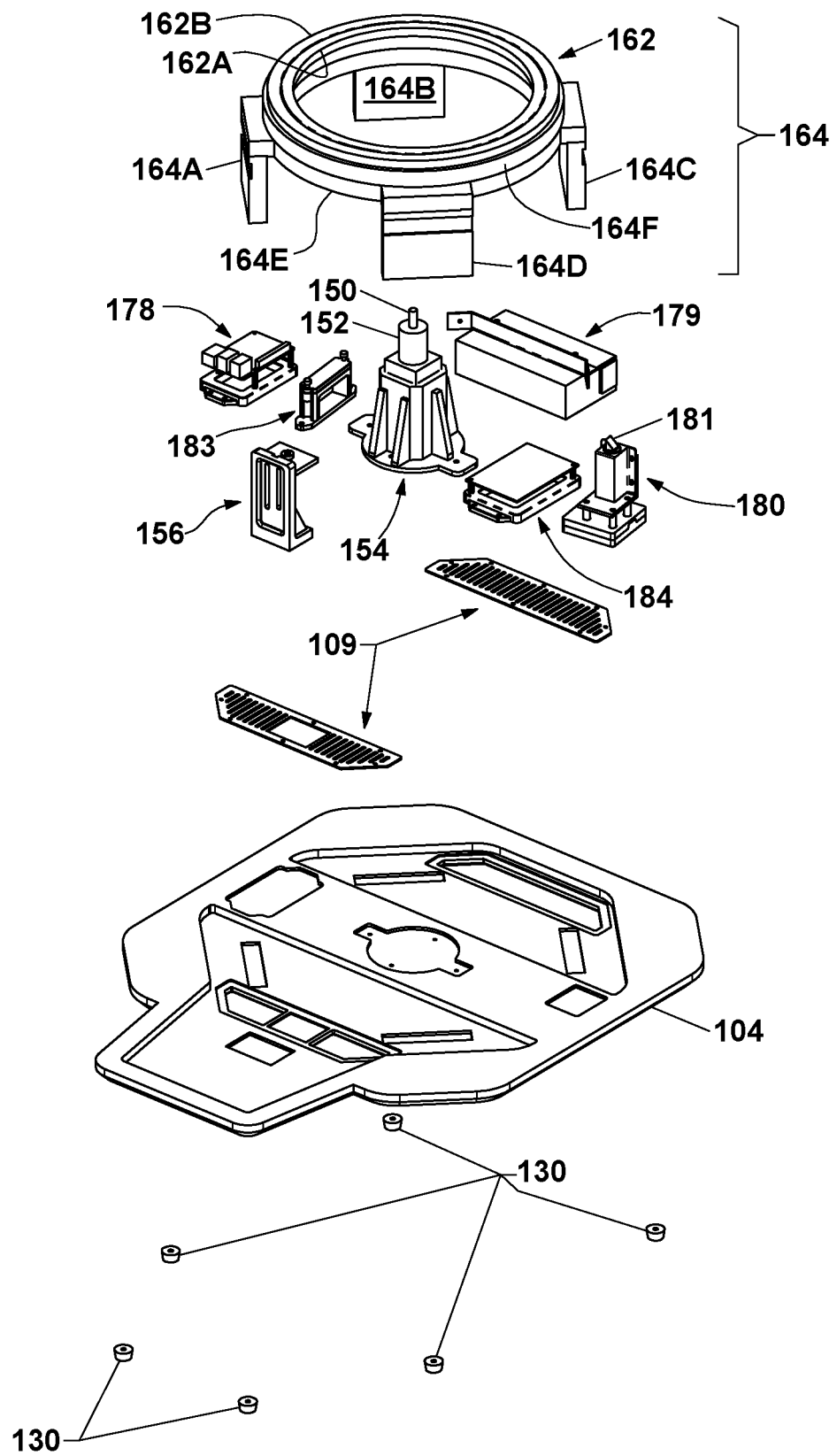
FIG. 33 is an exploded perspective view of the subassembly of FIG. 32, with the storage slot security barrier removed entirely.

The apparatus is electrically powered via any suitable power supply, such as a 110 volt power cord or via a battery disposed at the base of the apparatus (such as shown in FIG. 33). As shown in FIG. 33, a circuit board 184 is disposed at the base and is electrically connected to the power source 179 (such as an electrical power supply with cord and plug or a battery power source). A programmable controller 178 is electrically powered and operates to drive the motor in the motor mounting base 154 to rotatably drive the motor shaft 150, which imparts rotation of the carousel via engagement of the shaft to the carousel spindle 144 (FIG. 30) at the carousel bottom plate 140. A rotation lock solenoid assembly 180 includes a wedge-plunger 181 that engages with a respective ring stop slot 165A (FIG. 30) in the lock ring assembly 165 of the carousel when the solenoid is actuated (to extend the plunger) to stop and secure the carousel assembly 134 at the desired or selected location (with the selected storage space located at the door).

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A mobile device storage and tracking system, said mobile device storage and tracking system comprising:
    a housing;
    a carousel disposed in said housing, said carousel comprising a plurality of storage spaces configured to store a mobile device therein;
    wherein said housing comprises a door, and wherein said door is openable to access a storage space of said carousel and closable to close said housing;
    an input device;
    a control operable to control said door and said carousel responsive to said input device;
    wherein said mobile device storage and tracking system is configured to be disposed at a facility so as to be accessible by employees at the facility;
    wherein, responsive to a user input by a user at said input device that is indicative of a particular user, said control rotates said carousel to position a selected storage space at said door and unlocks said door, whereby the particular user can store a mobile device at that selected storage space;
    wherein, after the particular user stores the mobile device at that selected storage space, said control closes and locks said door;
    wherein, when the particular user again provides the user input at said input device, said control unlocks said door and rotates said carousel to position the selected storage space at said door;
    wherein said control is operable to monitor, for each particular user, when the particular user's mobile device is at said carousel and when the particular user's mobile device has been removed from said carousel;
    wherein, for a predetermined time period corresponding to a work shift at the facility, said control automatically determines and records an amount of time that each particular user has his or her mobile device removed from the storage space of said carousel during the work shift, and wherein, during the work shift, said control is operable to record multiple amounts of time when each particular user has his or her mobile device removed from the storage space of said carousel;
    wherein said control determines that the work shift for a particular user starts when the particular user first stores his or her mobile device on a given day; and
    wherein, at the end of the work shift, said control records the total amount of time that each particular user had his or her mobile device removed from the storage space of said carousel during the work shift and the total amount of time that each particular user's mobile device was at said carousel during the work shift so as to provide an automated timekeeping and recording system for each particular user.

2. The mobile device storage and tracking system of claim 1, wherein said carousel comprises a blocking space that is positioned at said door when a user is not storing or removing a mobile device at said carousel.

3. The mobile device storage and tracking system of claim 1, wherein said user input comprises a biometric input to identify the particular user.

4. The mobile device storage and tracking system of claim 1, wherein said user input comprises a personal identification number.

5. The mobile device storage and tracking system of claim 1, wherein, over multiple work shifts, said control records the total amount of time that each particular user has his or her mobile device removed from the storage space of said carousel and the total amount of time that each particular user's mobile device is at said carousel.

6. The mobile device storage and tracking system of claim 1, wherein said control generates an output when a time period that a particular user has his or her mobile device removed from the storage space of said carousel reaches a threshold time period.

7. The mobile device storage and tracking system of claim 1, wherein said control assigns a particular storage space for a particular user responsive to identification of the particular user via the user input at said input device.

8. The mobile device storage and tracking system of claim 1, wherein, when a particular storage space is at said door and said door is unlocked, said carousel and said housing preclude access to other storage spaces of said carousel.

9. The mobile device storage and tracking system of claim 1, comprising a sensor that determines presence of a mobile device in a storage space.

10. The mobile device storage and tracking system of claim 9, wherein the sensor comprises a camera disposed at said housing, and wherein the camera views a storage space positioned at or near where said camera is located to determine presence of a mobile device in that storage space.

11. The mobile device storage and tracking system of claim 9, wherein said sensor comprises a plurality of sensors, with a sensor of the plurality of sensors disposed in each storage space to determine presence of a mobile device in the respective storage space.

12. A method of monitoring employee use of mobile devices at work, said method comprising:

providing a mobile device storage and tracking system that comprises a housing and a carousel disposed in the housing and comprising a plurality of storage spaces, wherein the housing comprises a door that is openable to access a storage space of the carousel and closable to close the housing;

identifying a particular user via an input device;

responsive to a user input at the input device that is indicative of the particular user, rotating the carousel via a control to position a selected storage space at the door and unlocking the door, whereby the particular user can store a mobile device at that selected storage space;

after the particular user stores the mobile device at that selected storage space, closing and locking the door via the control;

responsive to the particular user again providing the user input at the input device, unlocking the door and rotating the carousel via the control to position the selected storage space at the door;

monitoring, via the control, and for each particular user during a work shift, when the particular user's mobile device is at the storage space of the carousel and when the particular user's mobile device has been removed from the storage space of the carousel;

monitoring, via the control, an amount of time that each particular user has his or her mobile device removed from the storage space of the carousel during the work shift;

determining, via the control, that the work shift for a particular user starts when the particular user first stores his or her mobile device on a given day; and recording, via the control, the determined amount of time that each particular user has his or her mobile device removed from the storage space of the carousel during the work shift.

13. The method of claim 12, wherein the user input comprises a biometric input to identify the particular user.

14. The method of claim 12, wherein the user input comprises a personal identification number.

15. The method of claim 12, comprising assigning via the control a particular storage space for a particular user responsive to identification of the particular user via the user input at the input device.

16. The method of claim 12, comprising detecting presence of the mobile device in the storage space via a sensor.

17. The method of claim 16, wherein the sensor comprises one selected from the group consisting of (i) a camera disposed at the housing and viewing a storage space positioned at or near where the camera is located to determine presence of the mobile device in that storage space, and (ii) a plurality of sensors, with a sensor of the plurality of sensors disposed in each storage space to determine presence of a mobile device in the respective storage space.

* * * * *

UNITED STATES PATENT AND TRADEMARK OFFICE
CERTIFICATE OF CORRECTION

PATENT NO. : 10,650,352 B2  
APPLICATION NO. : 16/262124  
DATED : May 12, 2020  
INVENTOR(S) : Jacob G. Maki et al.

Page 1 of 1

It is certified that error appears in the above-identified patent and that said Letters Patent is hereby corrected as shown below:

In the Specification

<u>Column 14</u>
Line 10, "cooing" should be --cooling--
Line 30, "case that views" should be --case (such as attached at an inside corner of the case) that views--

Signed and Sealed this  
Sixteenth Day of June, 2020

Andrei Iancu  
*Director of the United States Patent and Trademark Office*